(12) United States Patent
Zheng et al.

(10) Patent No.: US 8,177,372 B2
(45) Date of Patent: May 15, 2012

(54) PROJECTOR APPARATUS

(75) Inventors: Wanjun Zheng, Shenzhen (CN);
Toshihiro Saruwatari, Osaka (JP);
Xianglin Zhang, Shenzhen (CN)

(73) Assignee: SANYO Electric Co., Ltd.,
Moriguchi-shi, Osaka (JP)

( * ) Notice: Subject to any disclaimer, the term of this patent is extended or adjusted under 35 U.S.C. 154(b) by 874 days.

(21) Appl. No.: 11/844,065

(22) Filed: Aug. 23, 2007

(65) Prior Publication Data

US 2008/0049193 A1 Feb. 28, 2008

(30) Foreign Application Priority Data

Aug. 25, 2006 (CN) .......................... 2006 1 0125656

(51) Int. Cl.
*G03B 21/18* (2006.01)
*G03B 21/26* (2006.01)
*G03B 21/16* (2006.01)
*B60Q 1/06* (2006.01)
*F21V 29/00* (2006.01)

(52) U.S. Cl. .............................. 353/58; 353/61; 362/373

(58) Field of Classification Search .................... 353/61, 353/60, 57, 58, 52, 119; 352/202; 348/748; 362/294, 373, 264
See application file for complete search history.

(56) References Cited

U.S. PATENT DOCUMENTS

| | | | |
|---|---|---|---|
| 6,203,159 B1* | 3/2001 | Takizawa | 353/61 |
| 6,739,831 B2* | 5/2004 | Hsu et al. | 415/60 |
| 2003/0174289 A1* | 9/2003 | Nakano | 353/31 |
| 2004/0141155 A1* | 7/2004 | Wang et al. | 353/61 |
| 2005/0264766 A1 | 12/2005 | Morimoto et al. | |
| 2007/0019168 A1* | 1/2007 | Nakagawa et al. | 353/58 |
| 2008/0094581 A1* | 4/2008 | Nakagawa et al. | 353/58 |

FOREIGN PATENT DOCUMENTS

| | | |
|---|---|---|
| CN | 1704839 A | 12/2005 |
| CN | 1248043 A | 3/2006 |
| JP | 8-275096 A | 10/1996 |
| JP | 10-186513 A | 7/1998 |
| JP | 11-087963 A | 3/1999 |
| JP | 2001-272919 A | 10/2001 |

(Continued)

OTHER PUBLICATIONS

JP-U-02-000754; Jan. 5, 1990.*

(Continued)

*Primary Examiner* — William C Dowling
*Assistant Examiner* — Ryan Howard
(74) *Attorney, Agent, or Firm* — Westerman, Hattori, Daniels & Adrian, LLP

(57) ABSTRACT

This invention provide a projector apparatus enabled to lower its exhaust air temperature by adding only minor modifications to the existing structure, without altering its basic structure. The liquid crystal projector apparatus of the invention has a casing (1) for accommodating therein a light source (4), an optical system adapted to construct imaging light in response to a beam of light received from the light source, a power supply (9), and a cooling unit (6) mounted on the side wall of the casing (1) to cool the components in the casing. Provided on the inner wall of the casing is an air inspiration mechanism (16, 17, 18, 126) in association with the exhaust unit (6), whereby the exhaust unit (6) can inspire ambient air through the air inspiration mechanism to lower the temperature of the air to be expired from the exhaust unit.

10 Claims, 26 Drawing Sheets

| | FOREIGN PATENT DOCUMENTS | |
|---|---|---|
| JP | 2002-244213 A | 8/2002 |
| JP | 2002-244215 A | 8/2002 |
| JP | 2002-373524 A | 12/2002 |
| JP | 2004-133304 A | 4/2004 |
| JP | 2006-171165 A | 6/2006 |
| JP | 2006-184810 A | 7/2006 |
| JP | 2007-093992 A | 4/2007 |
| WO | 02/31593 A1 | 4/2002 |

OTHER PUBLICATIONS

Japanese Office Action dated Nov. 29, 2011, issued in corresponding Japanese Patent Application No. 2007-201073.

* cited by examiner

INCIDENT LIGHT

PROJECTOR APPARATUS

FIELD OF THE INVENTION

Present invention relates to a projector apparatus equipped with an optical system adapted to construct imaging light from light received from a light source and project an enlarged beam of imaging light onto a front screen.

BACKGROUND OF THE INVENTION

This type of conventional projector apparatuses are equipped with a lamp serving as a light source and an optical system having such elements as a polarization beam splitter, polarization plates, liquid crystal panels (LCPs), and a projection lens, all housed in a casing. Provided on a wall of the casing is an exhaust unit adapted to create an air flow inside the casing to suppress temperature rise in the casing. (See for example, Japanese Patent Application Laid Open No. H8-275096.)

However, since the exhaust unit is orientated to the hot lamp so as to inspire air heated by the lamp, the air discharged from the exhaust unit is heated to a high temperature, which makes the user of the projector unpleasant when he is exposed to the hot air. Hence, in order to lower the temperature of the exhausted air, the exhaust fan of the exhaust unit must be operated at a high speed, which in turn creates a bothering noise.

In the market of portable projector apparatuses, low-cost competition is very severe, so that, in order to respond to a wide range of demands in the market, manufacturers often develop different models derived from the original basic model shortly after issuing the basic model to the market. In designing an improved model having a greater lighting intensity, designers are required to make an attempt to utilize as many elements of the basic model as possible in order to reduce the cost and development cycle for the new model. When the lighting intensity is increased in the new model, a designer will be motivated to add only local or minor changes to the existing cooling system to provide the new model with additional and sufficient cooling power, without altering its basic structure.

SUMMARY OF THE INVENTION

In view of such aspects of projection apparatuses, it is an object of the invention to provide a projector apparatus enabled to lower its exhaust air temperature by adding only minor modifications to the existing structure, without altering its basic structure.

A projector apparatus in accordance with one aspect of the invention has a light source, an optical system adapted to construct imaging light in response to a beam of light received from the light source, both accommodated in a casing, and an exhaust unit mounted on an inner wall of the casing to cool the components inside the casing.

Provided on the inner wall of the casing is an air inspiration mechanism provided on an inner wall of the casing in association with the exhaust unit to allow the exhaust unit to inspire ambient air through the air inspiration mechanism and to lower the temperature of the air to be expired from the exhaust unit.

In one embodiment, the air inspiration mechanism comprises:

an inlet formed in the bottom wall of the lower half section of the casing (the inlet hereinafter referred to as lower case inlet); and an inlet formed in the lamp unit cover of the casing (the inlet hereinafter referred to as lamp cover inlet). The exhaust unit has a first and a second exhaust fan arranged on the wall of the casing. The lower case inlet formed in the bottom wall of the lower half section of the casing is arrange in association with the first exhaust fan and lamp cover inlet.

In operation, cool ambient air is introduced from outside into the projector apparatus through the lamp cover inlet. The air is then inspired, through the lower case inlet formed in the lower half section of the casing, into an opening formed in one side of the first exhaust fan. The cool ambient air taken from outside into the projector apparatus and the hot air inspired from the lamp unit are well mixed by the first exhaust fan before it is expired therefrom. The expired air is further mixed with the air expired from the second exhaust fan, and then discharged from the projector apparatus. It is noted that mixing of air by the second exhaust fan is facilitated by an increment of ambient air inspired by the first exhaust fan, and that the resultant exhaust air temperature is further lowered, as comparison with conventional exhaust air.

Specifically, the lamp cover inlet is formed in an oblique side of the lamp unit cover. This arrangement can prevent a problem that the lamp cover inlet could be caulked if the inlet were formed in the bottom of the projector and if the projector were placed on a table covered with, for example, a soft cloth.

The exhaust air temperature of the projector apparatus can be regulated by varying the areas of the openings of the inlets.

It is emphasized that in order for the first and/or second exhaust fan to achieve the enhanced cooling as described above, the first and/or second exhaust fan is provided with an inlet in the side wall of the exhaust fan (the inlet hereinafter referred to as lateral inlet).

More particularly, the first exhaust fan is installed with its air inspiration face oriented to the light source, while the second exhaust fan is installed with its air inspiration face oriented to an area away from the light source, so that two streams of air expired from the respective exhaust fans are directed to intersect each other. Specifically, the angle between the two intersecting air streams is set in the range from 40 to 60 degrees, which ensures sufficient mixing of the air flows from the first and second exhaust fans before the air is exhausted from the projector apparatus and causes the temperature of the exhausted air to be appreciably lowered in comparison with that of conventional projector apparatus.

Thus, by providing an additional lateral inlet in the side wall of the existing exhaust fan of the projector apparatus, it is possible to increase the proportion of cool air to the hot air inspired into the exhaust fan and lower the final temperature of the exhaust air, fulfilling the design goal.

DETAILED DESCRIPTION OF THE PREFERRED EMBODIMENT

An LC projector apparatus embodying the invention will now be described in detail with reference to the accompanying drawings. In what follows, the "front" side of the projector apparatus refers to the side thereof having its projection lens (FIG. 1), and the "right" and "left" of the LC projector apparatus refer to the directions to the "right" and "left" relative to the front side, respectively.

General Arrangement of the Projector Apparatus

Figure 1:
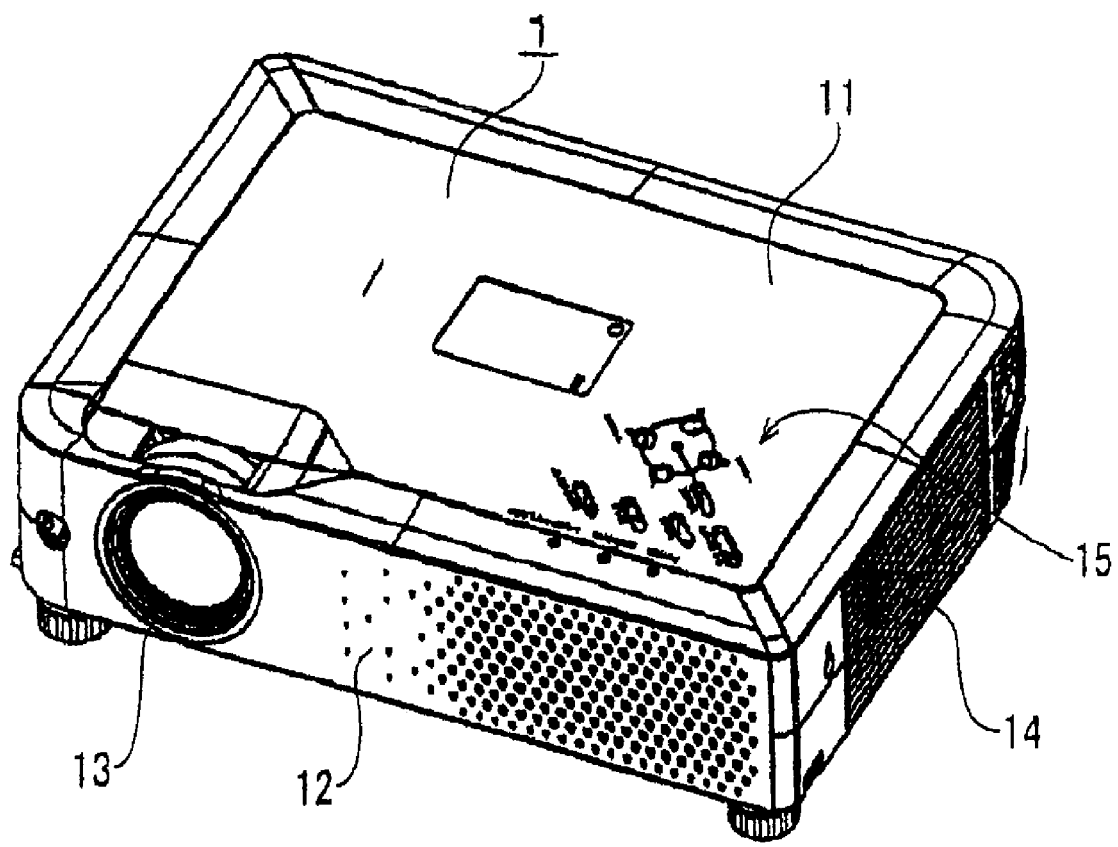
FIG. 1 is a perspective view of an LC (liquid crystal) projector apparatus in accordance with the present invention.

As shown in FIG. 1, an LC projector apparatus of present invention has a generally flat casing 1 which includes an upper half section 11 and a lower half section 12 of the casing 1. Provided on the upper end of the casing 1 is a controller 15 having a multiplicity of buttons for manual operation of the projector apparatus. Formed in the front end is a projection window 13. In addition, an exhaust 14 is provided in the right wall of casing 1 to exhaust the air in the casing 1 out of the casing 1.

Figure 2:
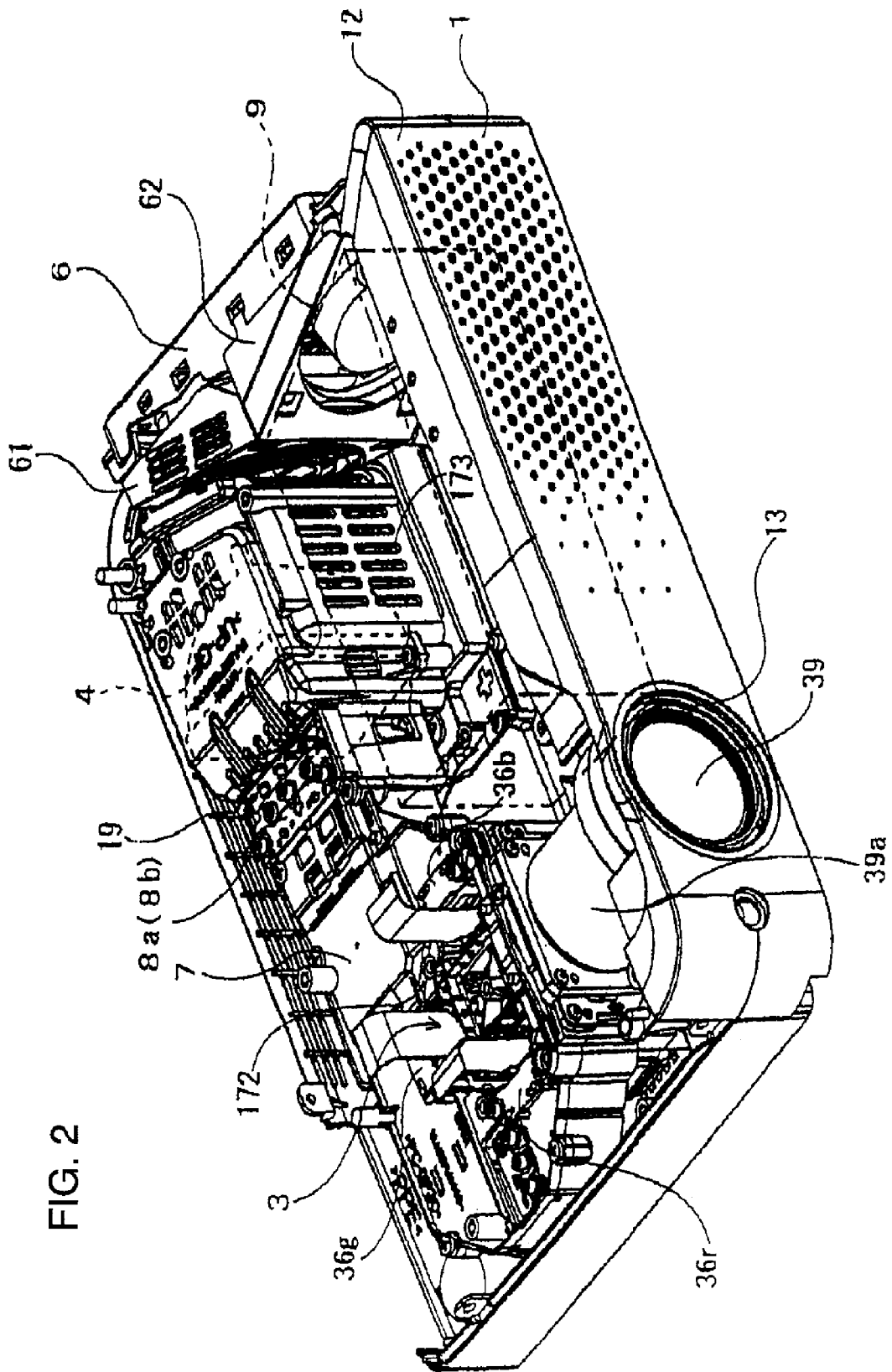
FIG. 2 is a perspective view of the LC projector apparatus shown in FIG. 1, with the upper half section of its casing removed.
Figure 3:
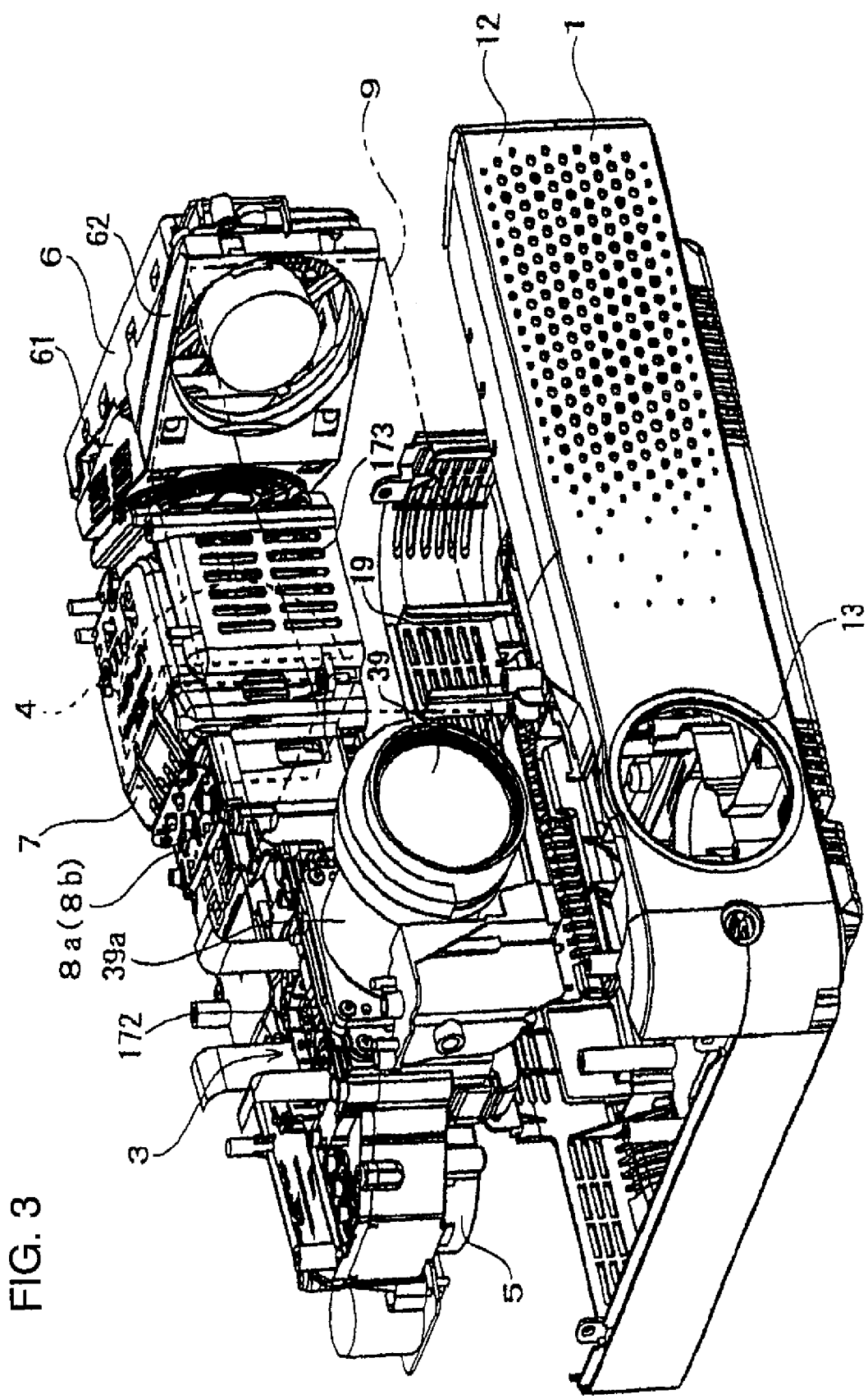
FIG. 3 is an exploded perspective view of the LC projector apparatus of FIG. 1, with the upper half section of the casing removed.

As shown in FIGS. 2 and 3, a generally L-shaped plastic case 7 for holding therein the optical system (the case hereinafter referred to as optical system holder case) extends in the casing 1. The holder case 7 accommodates therein: a lamp unit 4 serving as a light source; an optical system 2 (FIG. 5) for splitting the white light received from the lamp unit 4 into three beams of three primary colors (R, G, B beams); and an image synthesizing device 3 adapted to illuminate three LCPs with the B, G, and R beams to obtain imaging lights of three primary colors (B, G, and R imaging light) and synthesize them into a tricolor imaging light. Inside the optical system holder case 7, the lamp unit 4 is arranged at the right corner of the optical system holder case 7; the image synthesizing device 3, at the front corner; and the optical system 2, on the optical path between the lamp unit 4 and the image synthesizing device 3.

The base of a cylindrical member 39a for holding a projection lens 39 is connected to the front end of the optical system holder case 7. Also installed inside the casing 1 is a power unit 9 located in front of the optical system holder case 7.

As shown in FIG. 2, an exhaust unit 6 is mounted on the right wall of the lower half section 12 of the casing 1. The exhaust unit 6 includes a first exhaust fan 61 and a second exhaust fan 62. The first exhaust fan 61 is arranged with its air inspiration face directed to the lamp unit 4, while the second exhaust fan 62 is arranged with its air inspiration face directed to the electric power unit 9.

Figure 4:
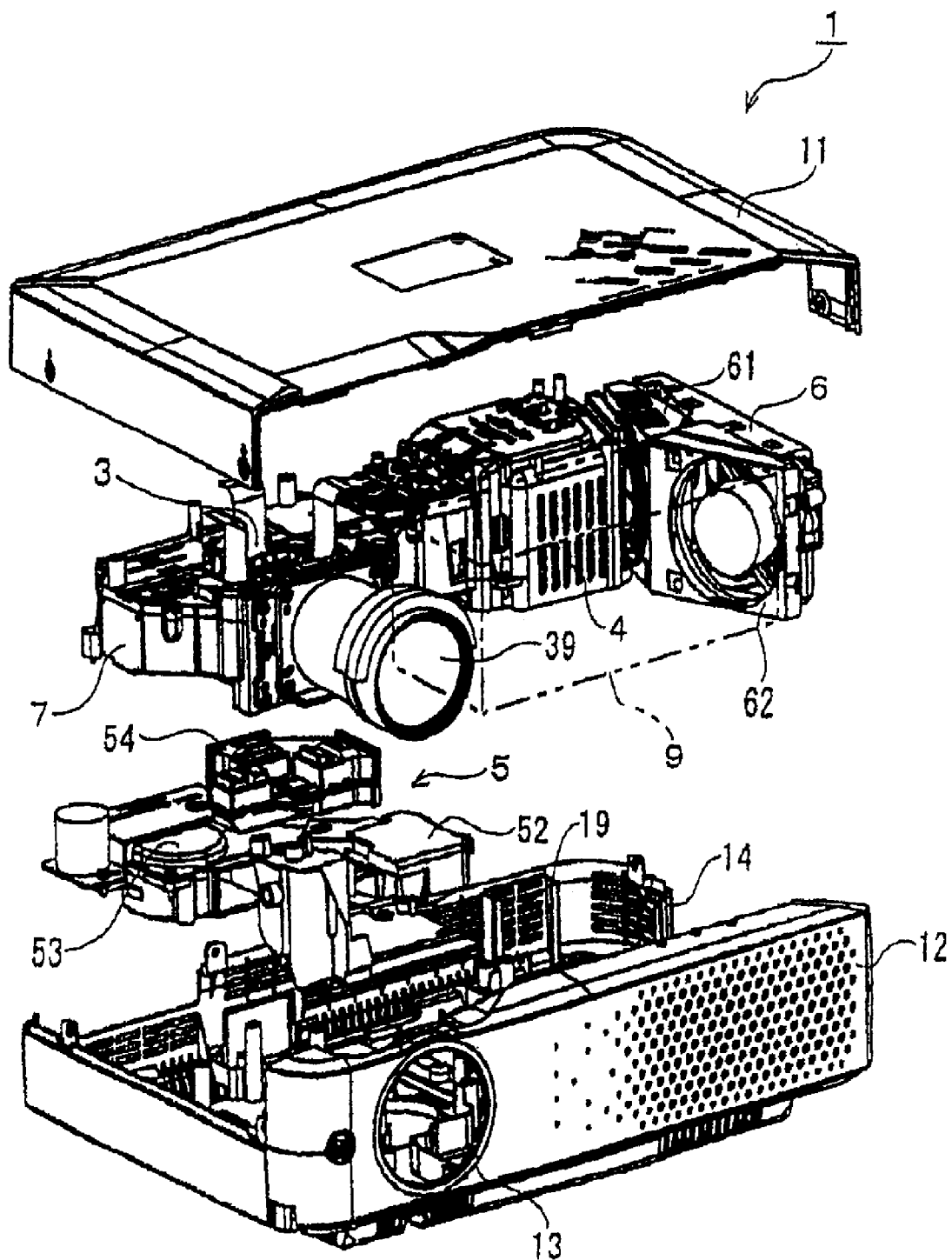
FIG. 4 is an exploded perspective view of the LC projector apparatus of FIG. 1.

A cooling unit 5 for cooling the image synthesizing device 3 is provided beneath the image synthesizing device 3, as shown in FIG. 4. The cooling unit 5 is equipped with a first cooling fan 52 and a second cooling fan 53. There is provided in the bottom wall of the lower half section 12 of the casing 1 a window (not shown) for installation of the first and second cooling fans 52 and 53, respectively. The cooling fans 52 and 53 blow air onto the image synthesizing device 3 through air channels formed in the housing 54 of the cooling unit 5.

The structure of the LC projector apparatus of the present invention will now be described in detail below.

Optical System 2

Figure 5:
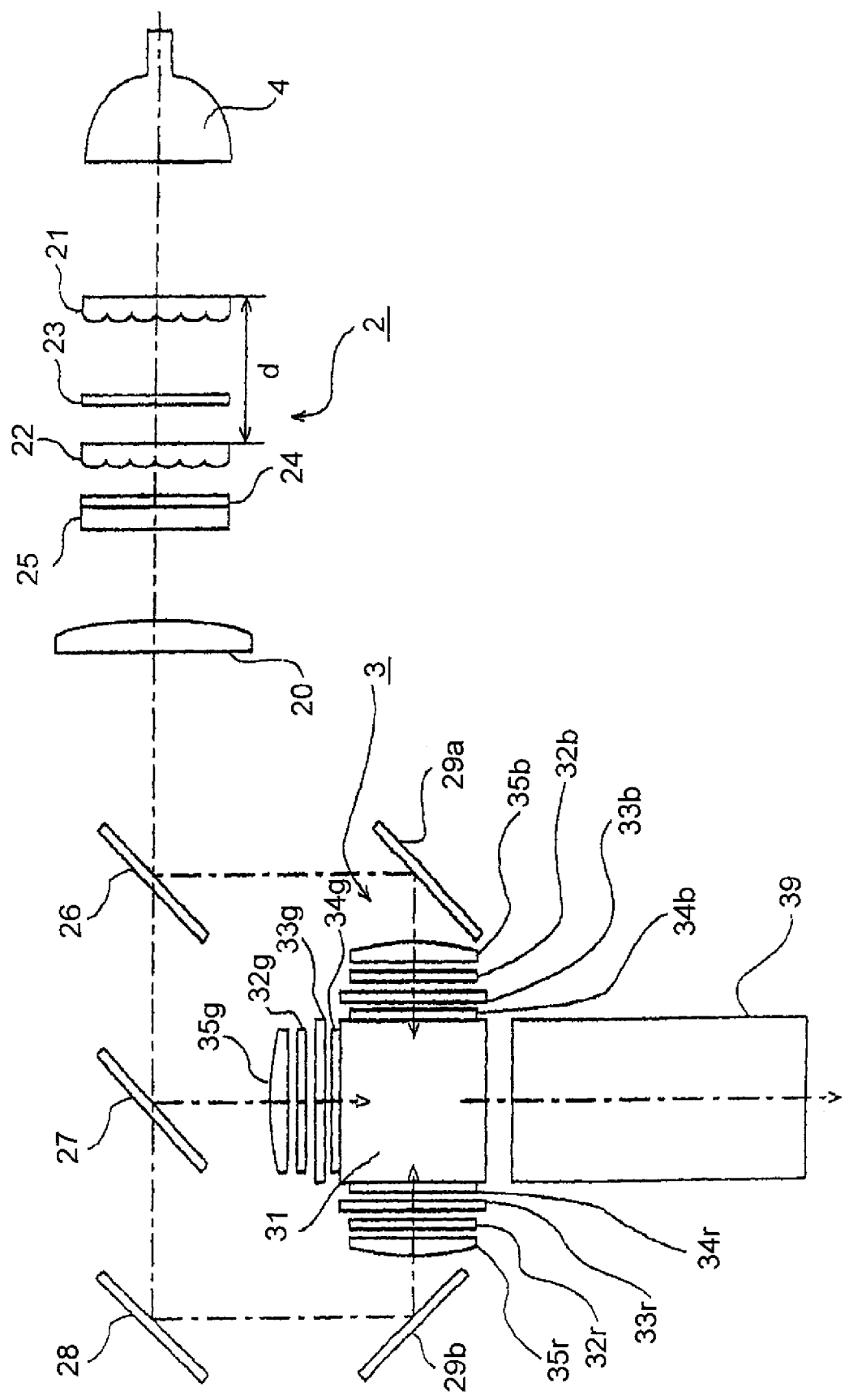
FIG. 5 is a diagram showing the arrangement of an optical system of the LC projector apparatus of FIG. 1.

The white light received from the lamp unit 4 is led to a first dichroic mirror 26 via a first integrator lens 21, a pre-stage slit plate 23, a second integrator lens 22, a post-stage slit plate 24, a polarization beam splitter 25, and a field lens 20, as shown in FIG. 5.

The first integrator lens 21 and second integrator lens 22 are fly-eye lenses made of a heat resistive glass, adapted to make uniform the illumination distribution of the white light emitted from the lamp unit 4. The pre-stage slit plate 23 and the post-stage slit plate 24 are thin aluminum film adapted to block those components of incident light which are unwanted by the polarization beam splitter 25.

Figure 6:
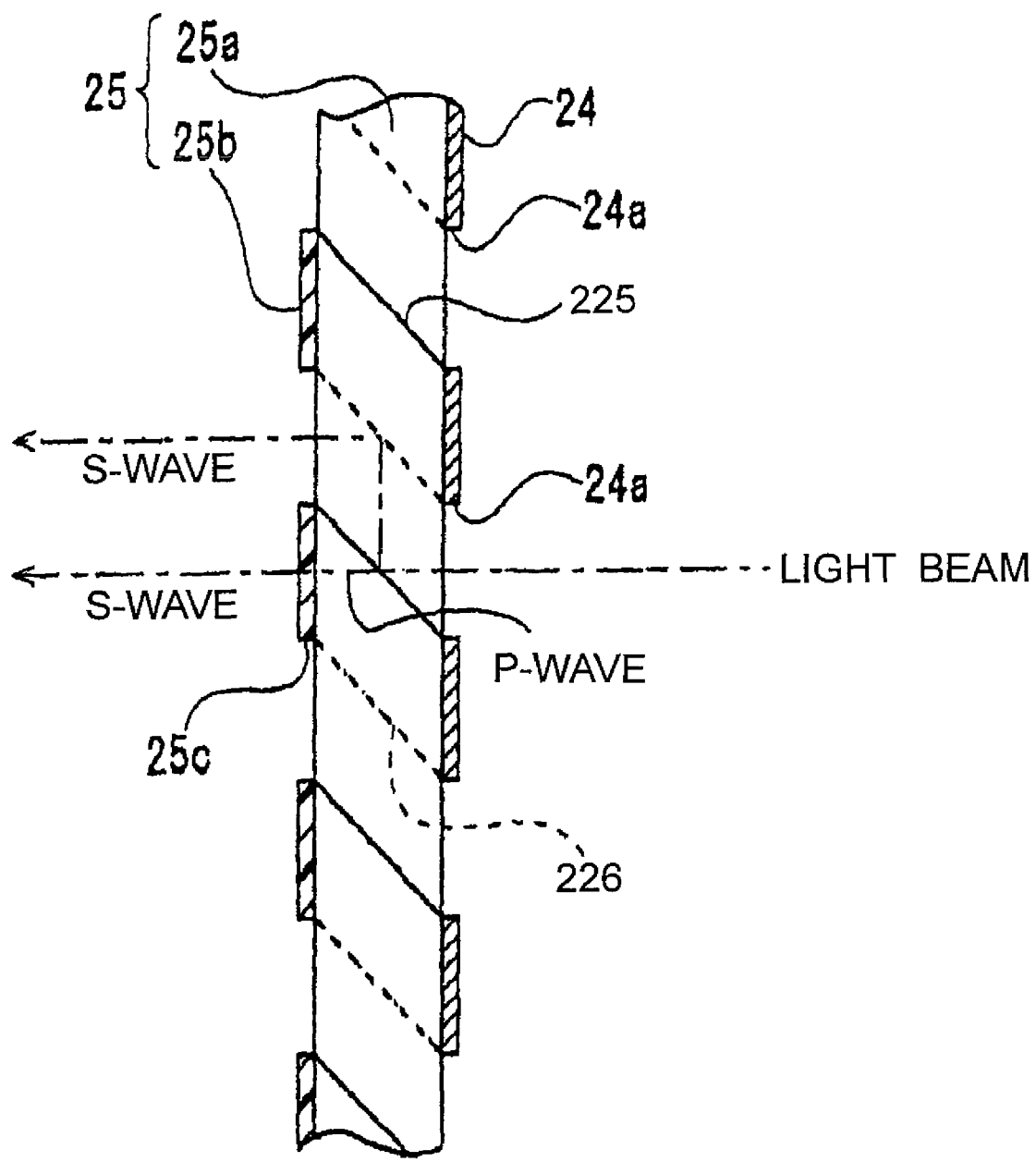
FIG. 6 is a sectional view of a post-stage slit plate and of a polarization beam splitter of the optical system.

The polarization beam splitter 25 consists of half-wavelength slits 25b bonded onto the light-emerging surface of a polarization plate 25a. Tightly adhered to the light-entering surface (incidence face) of the polarization plate 25a are post-stage slit plates 24, as shown in FIG. 6.

The polarization plate 25a is provided inside thereof with first interfaces 225 for permitting P-waves that has entered the polarization plate 25a to pass through them and for reflecting back S-waves, and second interfaces 226 for forwardly reflecting the S-waves reflected by the interfaces 125. These two types of interfaces appear alternately in the polarization plate 25a, each inclined at 45 degrees relative to the surface of the polarization plate 25a. The post-stage slit plate 24 has slits 24a such that they allow incident beams of light to impinge on the first interfaces 225 and block the incident beams impinging on the second interfaces 226.

Of the incident beams of light impinging on the first interface 125, P waves pass through the first interface 125, and then pass through the half-wavelength plate 25b, resulting in S waves of the opposite phase. On the other hand, the S waves are reflected by the first interfaces 225 to the second interfaces 226, reflected again by the second interfaces 226, and sent out of the slits 25c of the ½ wavelength plate 25b. Therefore, only S waves will be emitted from the polarization beam splitter 25.

The light that has passed through the polarization beam splitter 25 reaches the first dichroic mirror 26 via the field lens 20, as shown in FIG. 5. This first dichroic mirror 26 reflects only blue component of light, letting red and green components of light to pass through it. A second dichroic mirror 27 reflects green component of light, and allows red component of light to pass through it. A field mirror 28 reflects green light. Thus, the white light emitted from the lamp unit 4 is split by the first and second chroic mirrors 26 and 27 into blue (B), green (G), and red (R) light in sequence, which are led to the image synthesizing device 3.

Conventional optical systems of LC projector apparatuses do not have a pre-stage slit plate 23 constituting the optical system 2 of the inventive LC projector apparatus as shown in FIG. 2.

FIG. 6 shows the arrangement of a polarization beam splitter 25 used in the present invention, which beam splitter, however, is essentially the same in structure as conventional polarization beam splitters. The description given below, therefore, also applies to a conventional beam splitter.

If light directly impinges on the second interfaces 226 of the polarization beam splitter 25, it will fail to fully function as a polarization beam splitter. Therefore, it is necessary to precisely align the first interfaces 225 of the polarization beam splitter 25 with the respective slits 24a of the post-stage slit plate 24. To do this, the post-stage slit plate 24 is placed in contact with, or adjacent to, the incidence surface of the polarization beam splitter 25.

A care must be taken to maintain the polarization beam splitter 25 within a permissible range of temperature, since otherwise the polarization function of the beam splitter 25 will be significantly deteriorated. However, in conventional optical systems, the post-stage slit plate 24 is heated by the radiation from the lamp unit 4 and located in contact with or adjacent to the surface of the incidence surface of the polarization beam splitter 25, so that the heated post-stage slit plate 24 transfers heat to the polarization beam splitter 25, raising it disadvantageously to a high temperature.

Figure 7:
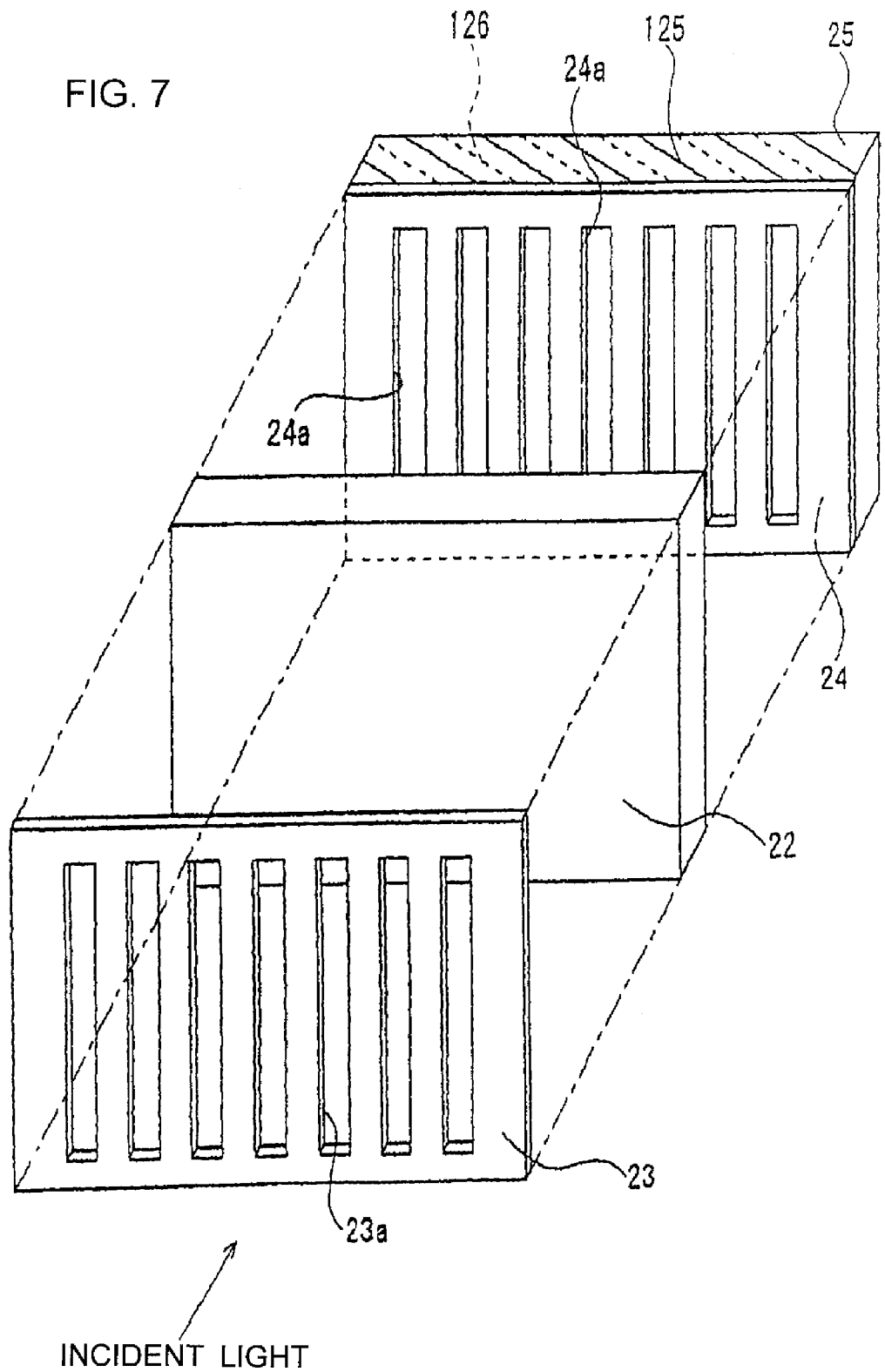
FIG. 7 is a perspective view of a pre-stage slit plate, a second integrator lens, a post-stage slit plate, and a polarization beam splitter.

In contrast, in the LC projector apparatus of the present invention, the pre-stage slit plate 23, disposed between the lamp unit 4 and the post-stage slit plate 24 along the optical path of the optical system 2, has a multiplicity of slits 23a such that the slits 23a are arranged to optically overlap with the slits 24a of the post-stage slit plate 24 as shown in FIG. 7, so that most of the incident light unwanted by the polarization beam splitter 25 are cut by the pre-stage slit plate 23. As a result, unwanted light received by the post-stage slit plate 24 is greatly reduced as compared with conventional optical system, thereby successfully preventing the post-stage slit plate 24 from being heated to a high temperature beyond the permissible range.

Although the pre-stage slit plate 23 is heated by light from the lamp unit 4 to a high temperature, only a little amount of heat is transferred from the pre-stage slit plate 23 to the polarization beam splitter 25 due to the fact that the polarization beam splitter 25 is not only spaced apart from the pre-stage slit plate 23 but also intervened by the second integrator lens 22 made of a low thermal conductivity placed between the pre-stage slit plate 23 and the post-stage slit plate 24.

As a result, in the LC projector apparatus of present invention, the temperature rise of the polarization beam splitter 25 of the optical system 2 can be minimized within the permissible temperature range, thereby avoiding the problem that the polarization beam splitter 25 is over-heated.

Image Synthesizing Device 3

Figure 8:
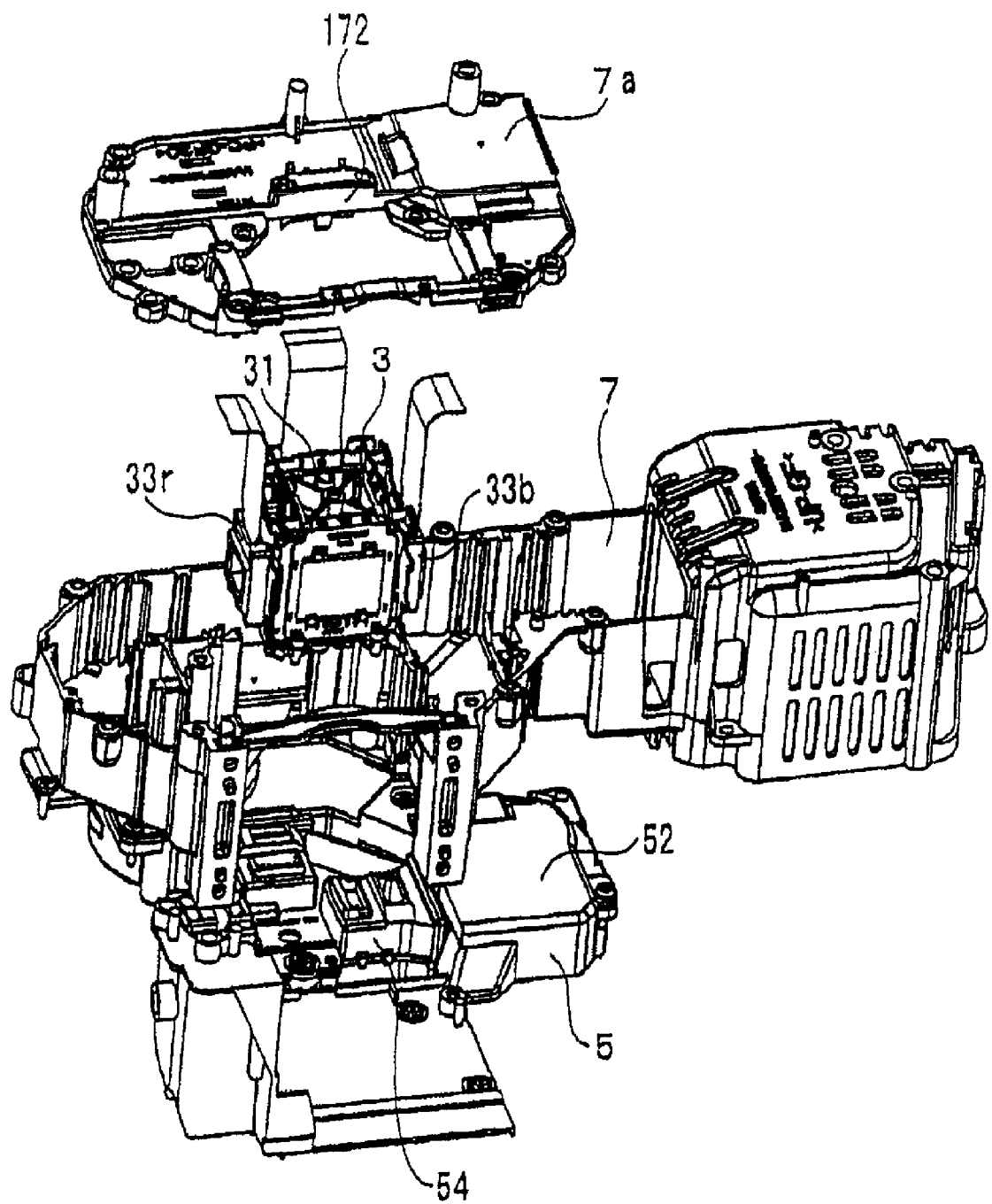
FIG. 8 is an exploded perspective view of an optical system holder case, a light composition device, and a cooling unit.
Figure 9:
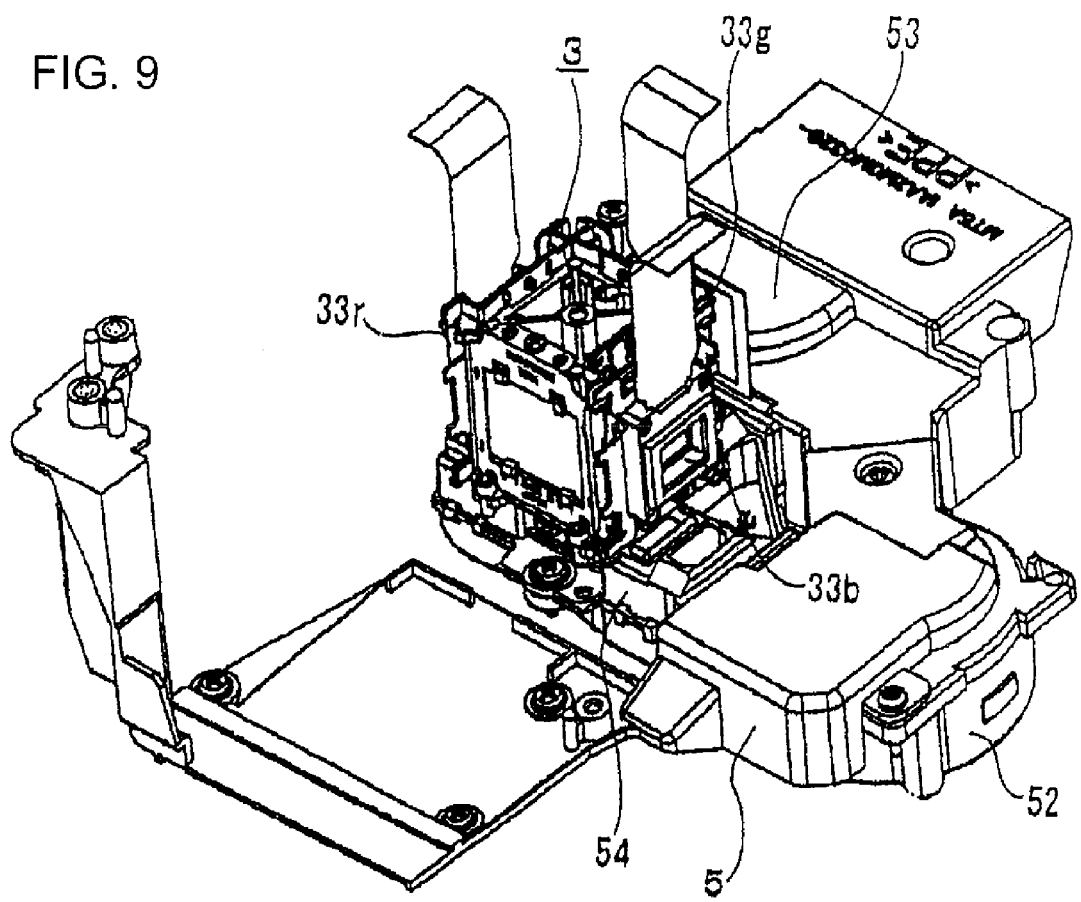
FIG. 9 is an exploded perspective view of a light composition device and a cooling unit.

The image synthesizing device 3 includes a cubic color composition prism 31, an LCP 33b for blue (referred to as B-LCP 33b), an LCP 33g for green (referred to as G-LCP 33g), and an LCP 33r for red (referred to as R-LCP 33r), which are respectively mounted on three faces of the cubic color composition prism 31, as shown in FIGS. 8 and 9.

The image synthesizing device 3 is installed in an optical system holder case 7 through an opening 172 formed in the optical system holder case 7, as shown in FIG. 8. The opening 172 has a lid 7a.

Referring to FIG. 2, there are shown incidence polarization plate holders 36b, 36g, and 36r for holding respective B-, G-, R-incidence polarization plates 32b, 32g, and 32r for blue, green and red light. The incidence polarization plate holders are mounted on the respective incidence surfaces of the B-, G-, and R-LCPs 33b, 33g, and 33r. The blue light beam reflected by the first dichroic mirror 26 and a field mirror 29a (FIG. 5) is directed to a field lens 35b, and then led to the color composition prism 31 via the B-incidence polarization plate 32b, B-LCP 33b, and a B-emergence polarization plate 34b.

Similarly, the green light beam reflected by the second dichroic mirror 27 is directed to a field lens 35g, and then led to the color composition prism 31 via a G-incidence polarization plate 32g, the G-LCP 33g, and a G-emergence polarization plate 34g.

The red light beam reflected by two field mirrors 28 and 29b is directed to a field lens 35r, and then led to the color composition prism 31 via the R-incidence polarization plate 32r, the R-LDP 33r, and an R-emergence polarization plate 34r.

These B-, G-, and R-imaging lights led to the color composition prism 31 are synthesized by the color composition prism 31 into a tricolor imaging light beam that is projected by the projection lens 39 onto a front screen.

Figure 10:
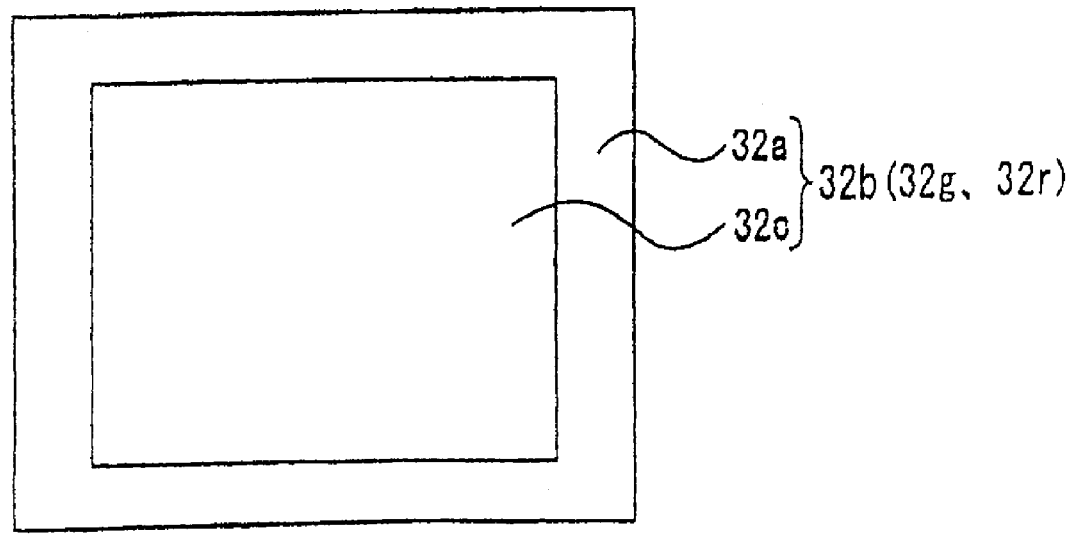
FIG. 10 is a front view of an incidence polarization plate.

Each of the B-, G-, and R-incidence polarization plates 32b, 32g, and 32r, respectively, is formed by bonding a polarization film 32c of a synthetic resin on the surface of a glass substrate 32a made of a sapphire glass, as shown in FIG. 10. The incidence polarization plates 32b, 32g, and 32r are cooled by ambient air blown by a cooling device 5 as shown in FIGS. 8 and 9, since otherwise each of the incidence polarization plates 32b, 32g, and 32r, and hence the polarization film 32c, is heated by light beyond the permissible temperature range and its polarization function will be significantly degraded.

To do this in conventional LC projector apparatuses, however, the fan of the cooling unit must be run at an exceedingly high speed, which results in a problematic big noise.

Figure 11:
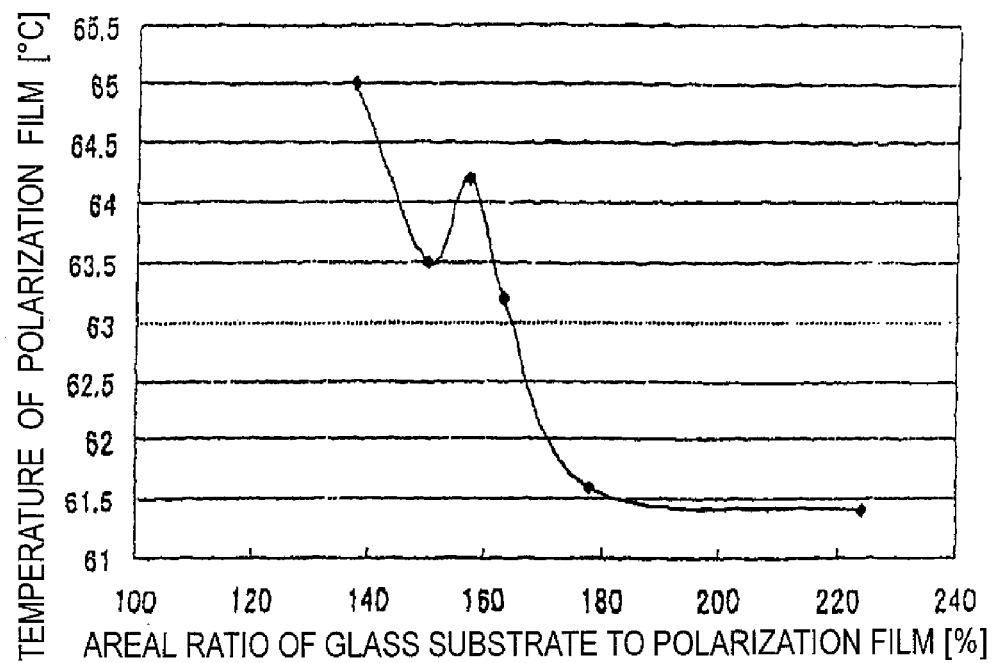
FIG. 11 is a graph showing the relationship between the areal ratio of a glass plate to a polarization plate and the temperature of the polarization plate.

In an attempt to lower the temperatures of the incidence polarization plates 32b, 32g, and 32r by varying the heat dissipating areas of the glass substrates 32a, a multiplicity of G-incidence polarization films 32g having different glass substrates of varied areas were made for a given area of polarization film 32c. These G-incidence polarization films 32g were mounted on the LC projector apparatus in turn to measure the temperature of a polarization film 32c in operation. Table 1 and FIG. 11 show the results of the measurements conducted for a polarization film 32c of 20.8 mm×16.3 mm, at 27° C.

TABLE 1

| Size of glass substrate [mm × mm] | Areal ratio of glass substrate to polarization film [%] | Temperature of Polarization Film [° C.] |
|---|---|---|
| 30.0 × 24.0 | 224 | 61.4 |
| 27.8 × 21.8 | 178 | 61.6 |
| 26.8 × 20.8 | 163 | 63.2 |
| 26.3 × 20.3 | 157 | 64.2 |
| 25.8 × 19.8 | 150 | 63.5 |
| 24.8 × 18.8 | 137 | 65.0 |

It is seen from Table 1 that the temperature of the polarization film 32c is stable at a comparatively low temperature when the ratio of the area of the glass substrate 32a to that of the polarization film 32c is equal to or greater than 178%. On the other hand, when the ratio is equal to or less than 150%, the temperature of the polarization film 32c rises significantly.

It is noted that the temperature of the polarization film 32c will be unstable when the areal ratio is in the range from 150% to 178%. This could be attributed to the fact that the heat transferred from the polarization film 32c to the glass substrate 32a and the heat dissipated from the glass substrate 32a are substantially in balance, so that if either one of the heat transfer and the heat dissipation changes for some reason, its temperature can easily change.

On the other hand, one may consider that when the areal ratio is set equal to or less than 150%, the amount of heat dissipated from the glass substrate 32a becomes less than the amount of heat transferred from the polarization film 32c to the glass substrate 32a, so that the temperature of the polarization film 32c rises significantly.

In this case, heat is first transferred from the polarization film 32c to the central area of the glass substrate 32a where the polarization film 32c is bonded and then gradually transferred to the surrounding areas. However, since the thermal conductivity of the glass substrate 32a is small, the temperature will not rise appreciably in peripheral areas at a certain distance away from the central area of the glass substrate 32a if the polarization film 32c is heated. Thus, only a little heat is dissipated from the peripheral areas.

As a consequence, the heat dissipative area does not increase appreciably with the surface area of the glass substrate 32a if the areal ratio is set to 178% or greater, It seems therefore that the polarization film 32c remains at a substantially constant temperature.

Based on the experimental results above, the optimum areal ratio of the glass substrate 32a to the polarization film 32c is determined to be 178% where the glass substrate 32a has the minimum areal ratio and yet the polarization film 32c can be maintained at a relatively low temperature in a stable manner. The dimensions of the polarization films 32c for B-, R-, and R-incidence polarization plates 32b, 32g, and 32g, respectively, are chosen to be 20.8 mm×16.3 mm, and the dimensions of the glass substrate 32a, to be 27.8 mm×21.8 mm.

Accordingly, the rotational speed of the cooling fan of the cooling device 5 can be reduced to reduce the level of the noise generated by the cooling device 5.

Optical System Holder Case 7

Figure 12:
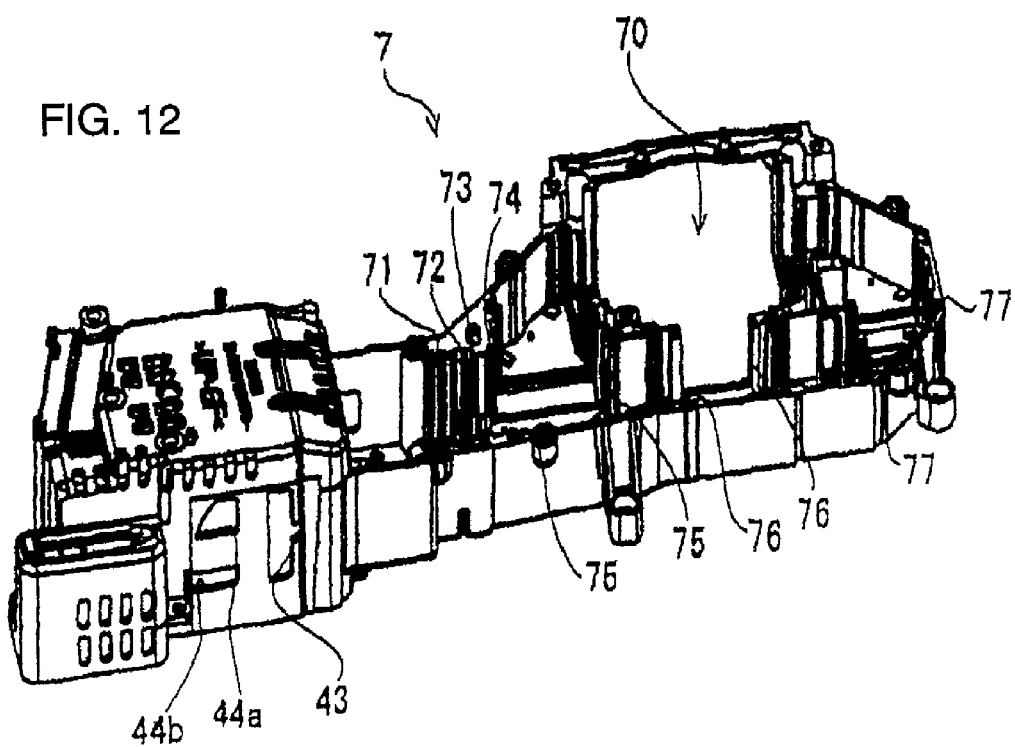
FIG. 12 is a perspective view of the optical system holder case shown in FIG. 8.
Figure 13:
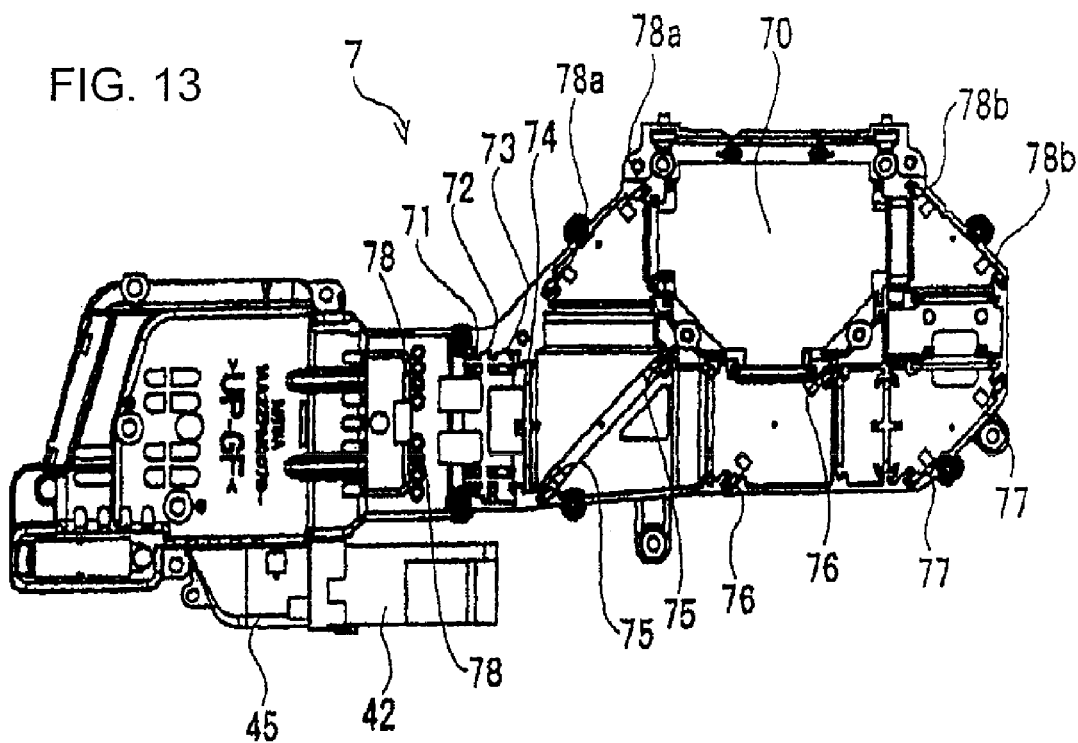
FIG. 13 is a plan view of the optical system holder case.

As described above, the optical system 2 shown in FIG. 5 includes the pre-stage slit plate 23, second integrator lens 22, post-stage slit plate 24, polarization beam splitter 25, field lens 20, first and second dichroic mirror 26 and 27, respectively, and three field mirrors 28, 29a, and 29b, all installed in the cast resin optical system holder case 7 as shown in FIGS. 12 and 13. The lamp unit 4 is installed at the far right of the optical system holder case 7, leaving a space 70 in front of the optical system holder case 7. The image synthesizing device 3 is installed in this space 70.

Formed on the opposite walls of the optical system holder case 7 along the optical path from the lamp unit 4 to the image synthesizing device 3 are: a first installation groove 71 for receiving therein the pre-stage slit plate 23 shown in FIG. 5; a second installation groove 72 for receiving therein the second integrator lens 22; a third installation groove 73 for receiving therein the post-stage slit plate 24 tightly coupled to the polarization beam splitter lens 25; a fourth installation groove 74 for receiving therein the field lens 20; a fifth and a sixth installation groove 75 and 76, respectively, for respectively receiving therein the first and second dichroic mirrors 26 and 27; and a seventh through a ninth installation grooves 77, 78a, and 78b, respectively, for respectively receiving therein the field mirrors 28, 29a, and 29b.

Figure 14:
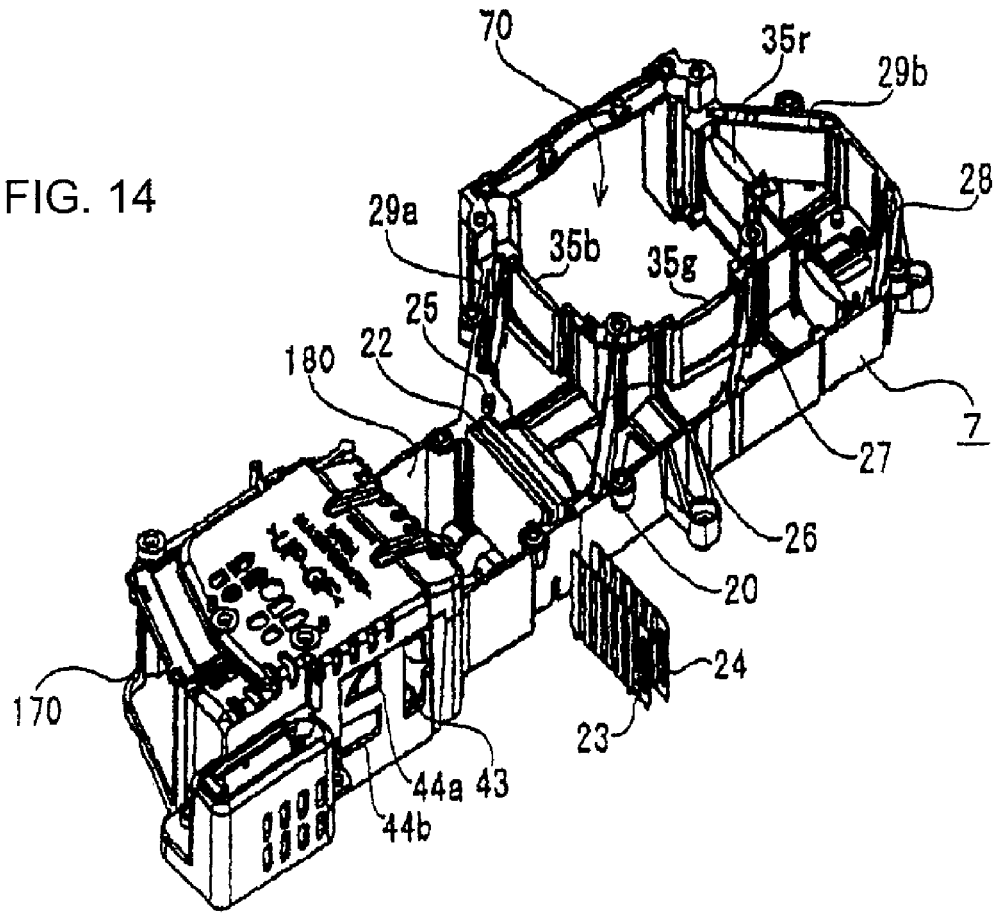
FIG. 14 is an exploded perspective view of the optical system holder case with the pre-stage and post-stage slit plates removed.
Figure 15:
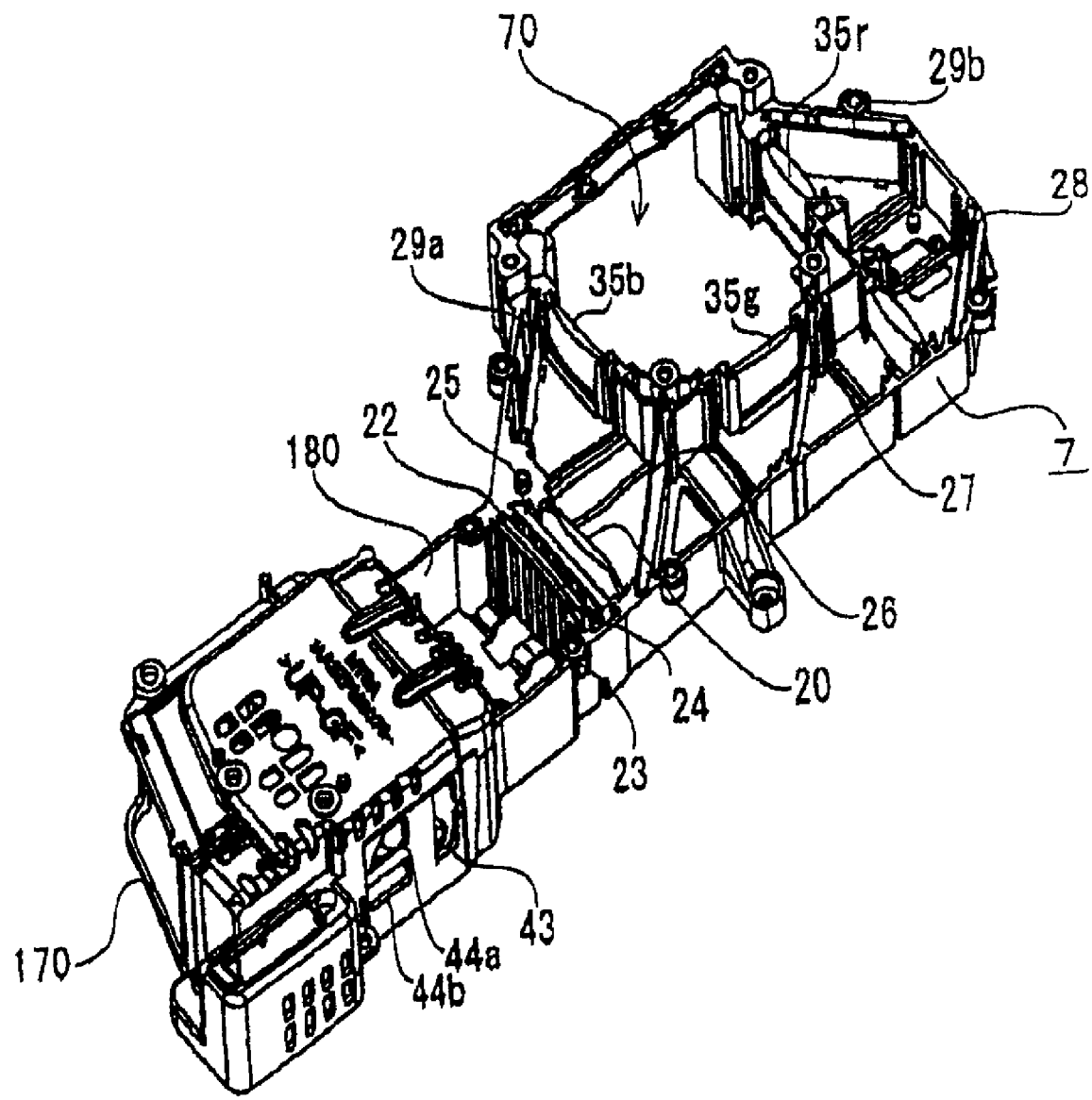
FIG. 15 is a perspective view of the optical system holder case accommodating optical components.

FIG. 14 shows the arrangement of the optical system 2 consisting of the pre-stage slit plate 23, second integrator lens 22, post-stage slit plate 24, polarization beam splitter 25, field lens 20, first and second dichroic mirrors 26 and 27, and three field mirrors 28-29b, all fitted in the respective installation grooves except for the pre-stage and post-stage slit plates 23 and 24, respectively. FIG. 15 shows the arrangement with all the elements fitted in the installation grooves.

The present invention can compatibly employ three LCPs each having a diagonal length of 0.6 inch (the LCPs hereinafter referred to as 0.6-inch LCPs) and three LCPs each having a diagonal length of 0.7 inch (the LCPs hereinafter referred to as 0.7-inch LCPs) as the liquid crystal panels 33r, 33g, and 33b.

The interval between the first integrator lens 21 and the second integrator lens 22 shown in FIG. 5 must be appropriately adjusted depending on the size of the LCPs used. In conventional LC projectors, the first and second integrator lenses 21 and 22, respectively, are held in two grooves spaced apart along the optical path and formed in the opposite walls of the optical system holder case. As a consequence, in order to employ a variety of LCDs, it is necessary to prepare multifold optical system holder cases having different intervals between the two grooves for the first and second integrator lenses 21 and 22. This requires extra design time and manufacturing cost.

Figure 18A:
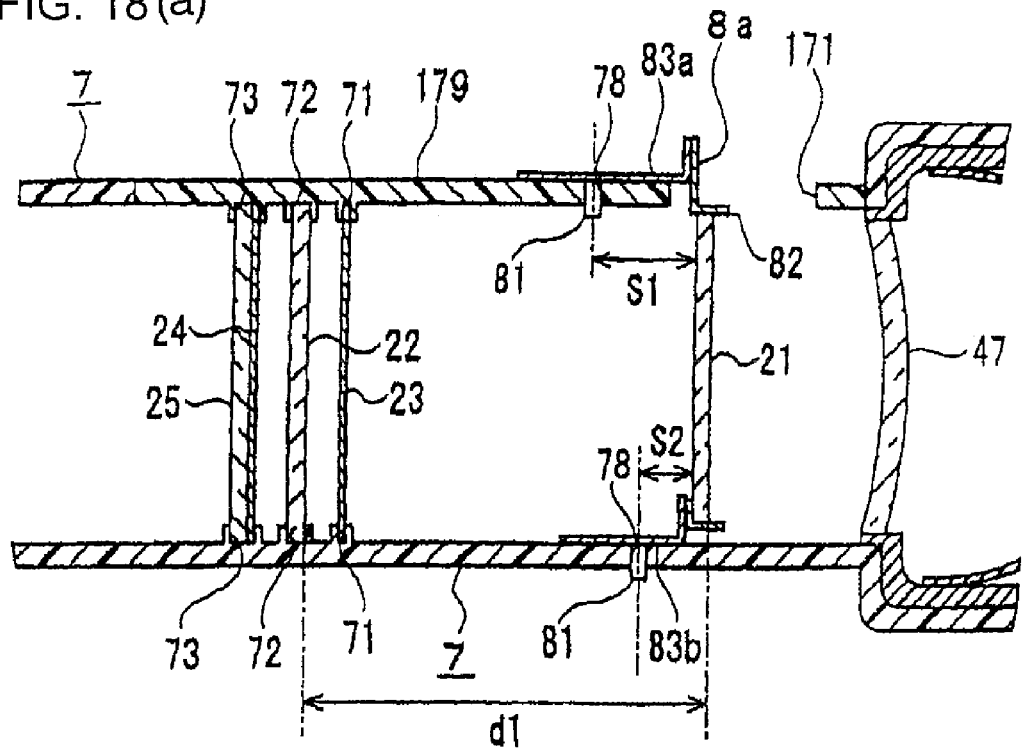
FIGS. 18(a)(b) are sectional views of a 0.6-inch LCP lens holder and a 0.7-inch LCP lens holder, respectively, mounted on the optical system holder case.
Figure 18B:
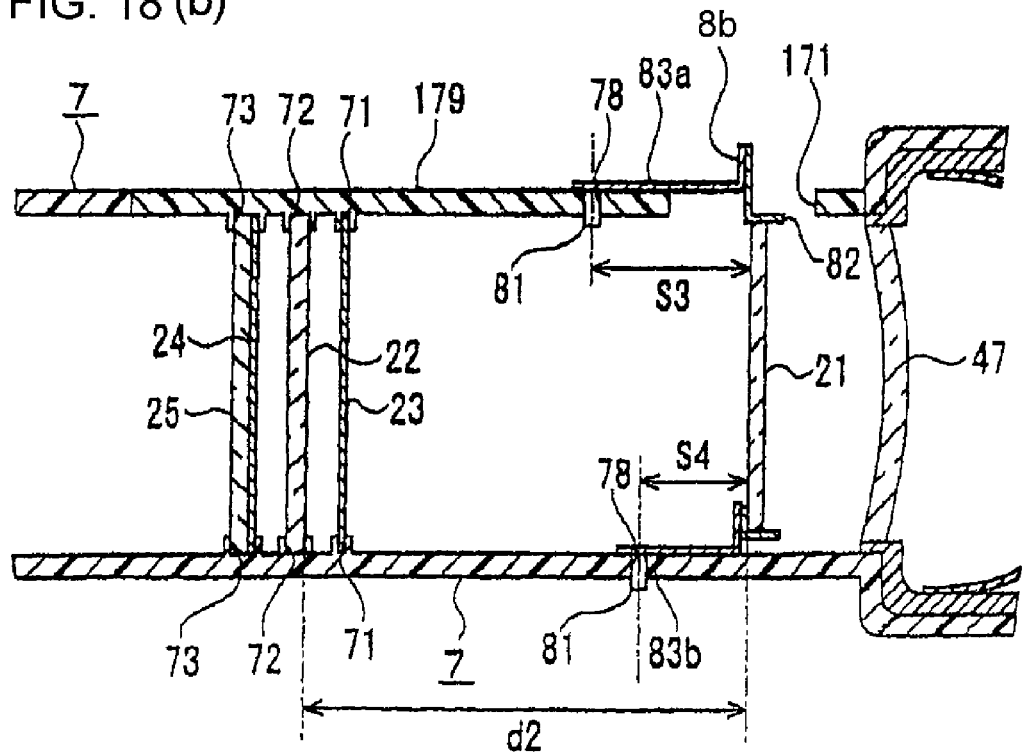

In contrast, the LC projector apparatus of the present invention permits installation of two compatible types of lens holders, for example, a lens holder 8a for holding the first integrator lens 21 for 0.6-inch LCP as shown in FIG. 18a (the lens holder hereinafter referred to as 0.6-inch LCP lens holder), and a lens holder 8b for holding the first integrator lens 21 for 0.7-inch LCP as shown in FIG. 18b (the lens holder hereinafter referred to as 0.7-inch LCP lens holder). The 0.6-inch LCP lens holder 8a and the 0.7-inch LCP lens holder 8b are identical in structure except that they have different positioning pin positions.

Figure 16:
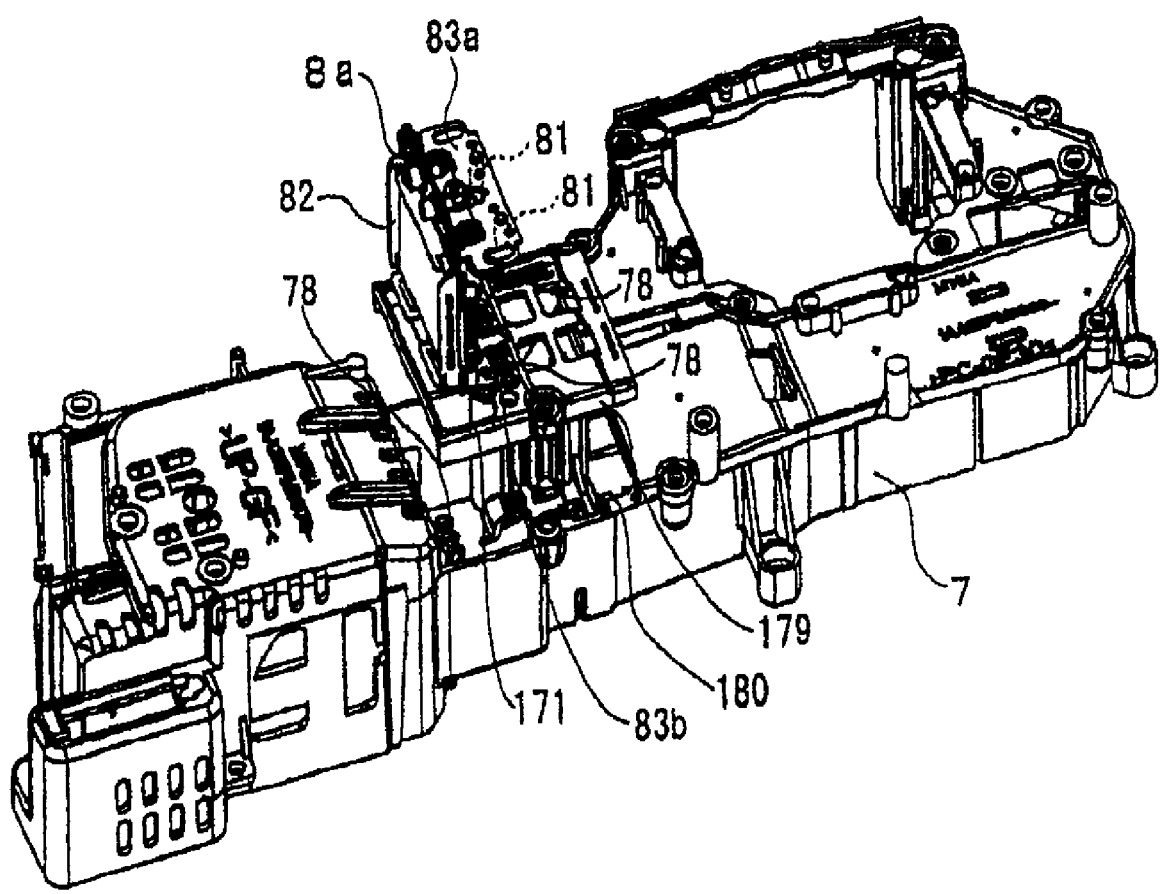
FIG. 16 is an exploded perspective view of the optical system holder case and a first-integrator lens holder.

As shown in FIG. 16, the 0.6-inch LCP lens holder 8a has a rectangular metal frame 82 for holding the first integrator lens 21, and a pair of upper and lower mounting panels 83a and 83b (each made of a metal sheet) that extend from the frame 82 along the upper and lower surfaces of the optical system holder case 7. Each of the mounting panels 83a and 83b has a pair of positioning pins 81 that project downward.

Referring again to FIGS. 14 and 15, there is shown a loading slot 180, provided in the upper wall of the optical system holder case 7, for loading the pre-stage slit plate 23, second integrator lens 22, post-stage slit plate 24, polarization beam splitter 25, and field lens 20.

Referring to FIG. 16, there is shown a top panel 179 attached to the upper wall of the optical system holder case 7 to close the loading slot 180. The top plate 179 has an opening 171 for inserting the lens holder 8a or 8b and positioning holes 78 for positioning the lens holder 8a or 8b inserted. Thus, the positioning holes 78 of the top plate 179 are adapted to receive the positioning pins 81 that protrude from the upper mounting panel 83a of the lens holder 8a or 8b.

Similarly, the bottom wall of the optical system holder case 7 has positioning holes 78, in which positioning pins 81 that protrude from the lower mounting panel 83b are fitted.

Figure 17:
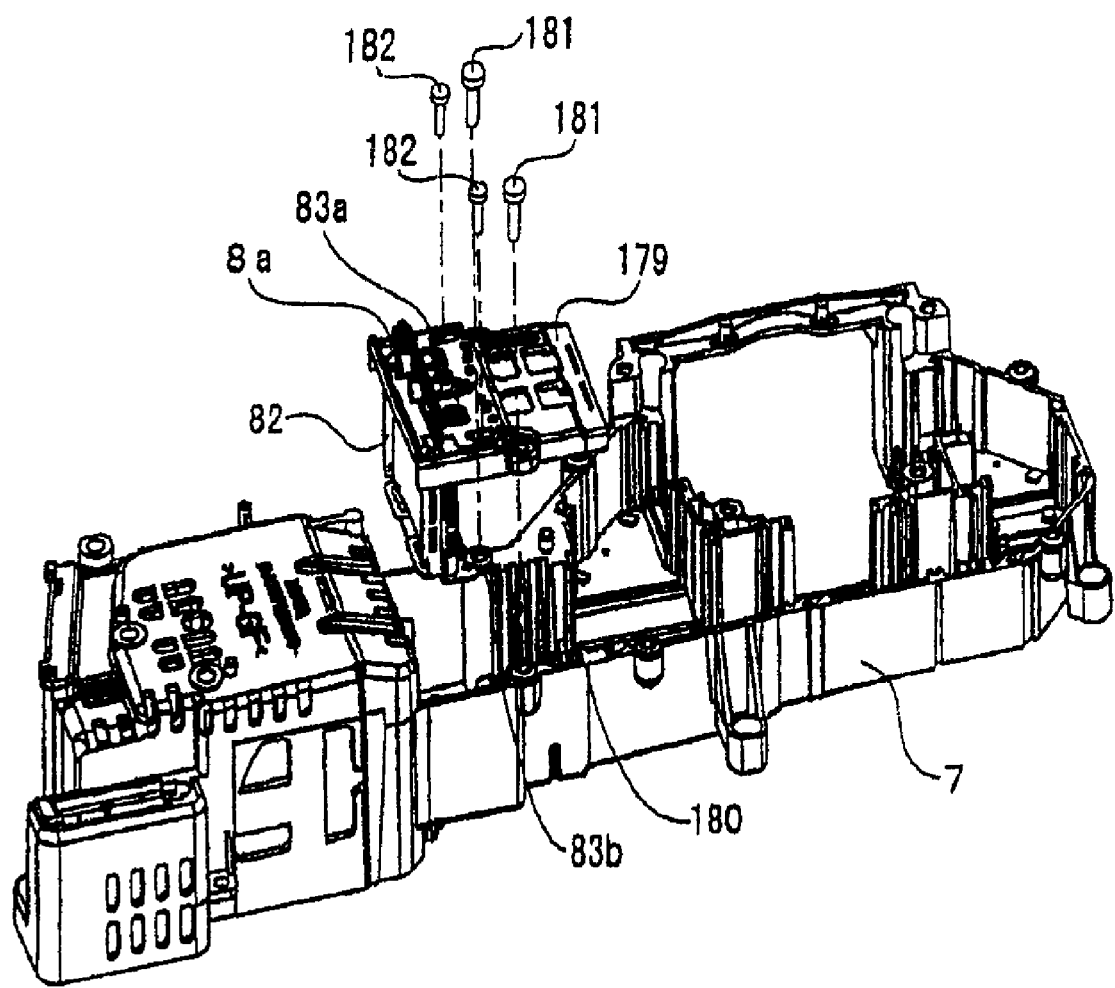
FIG. 17 is an exploded perspective view illustrating how to install the first-integrator lens holder in the optical system holder case.

The lens holder 8a, having its protruding positioning pins 81 fitted in the positioning holes, is secured to the top plate 179 with screws 182, as shown in FIG. 17. Further, the protruding positioning pins 81 formed on the lower mounting panel 83b of the lens holder 8a are fitted in the positioning holes 78 formed in the bottom wall of the optical system holder case 7, and then the top plate 179 is secured to the upper wall of the optical system holder case 7 with screws 181. In this way, the first integrator lens 21 is fixed at a predetermined position in the optical path.

Referring to FIG. 18(b), there is shown a 0.7-inch LCP lens holder having protruding positioning pins 81 at a distance further away from the frame 82 than the positioning pins 81 of the 0.6-inch LCP lens holder 8a. Thus, as shown in FIG. 18(b), the intervals S3 and S4 between the positioning pins 81 of the 0.7-inch LCP lens holder 8b and the surface of the first integrator lens 21 mounted on the frame 82 are greater than the corresponding intervals S1 and S2 between the positioning pins 81 of the 0.6-inch LCP lens holder 8a and the surface of the first integrator lens 21 mounted on the frame 82 shown in FIG. 18(a). As a consequence, the interval d2 between the first integrator lens 21 and the second integrator lens 22 will be larger in the 0.7-inch LCP lens holder 8b than the corresponding interval d1 in the 0.6-inch LCP lens holder 8a.

The interval d1 is set to the distance suitable for the 0.6-inch LPC, while the interval d2 is set suitable for the 0.7-inch LCP.

In this way, a variety of LCPs having different dimensions can be employed simply by selecting an appropriate lens folder adequate for the LPCs selected. Therefore, it is not necessary to prepare various types of optical system holder cases, thereby advantageously cutting design time and manufacturing cost of optical system holder cases, as required for prior art optical system holder cases.

Cooling Unit 5

Referring to FIGS. 4, 8 and 9, there is shown a cooling unit 5, mounted below the image synthesizing device 3, for cooling the image synthesizing device 3. In conventional LCP projector apparatuses, a cooling unit has a dedicated cooling fan for each of the R-, G-, and B-LCPs of an image synthesizing device.

Of the three optical paths for blue, green, and red light between the lamp unit 4 and the respective LCPs 33b, 33g, and 33r, the optical paths for blue and green light have the same length, while the optical path for red light is longer than the blue and green lights, as shown in FIG. 5. Since the intensity of light impinging on a target LCP diminishes with the optical path length to that LCP, the intensity of red light received by the LCP 33r is weakest.

The amounts of heat generated in the LCPs 33b, 33g, and 33r depend on the intensities of light impinging on the respective LCPs. Thus, the B-LCP 33b generates the largest amount of heat, while the R-LCP 33r generates the least amount of heat.

The invention now focuses on the difference in the amounts of heat generated in the respective LCPs 33b, 33g, and 33r that depend on the optical path length from the light source unit 4 to the LCPs. Thus, of the three cooling fans conventionally provided for the R-, G- and B-LCPs, the one dedicated to the R-LCP, which is heated least, is omitted in the invention, so that the cooling unit 5 has only two fans.

Figure 19:
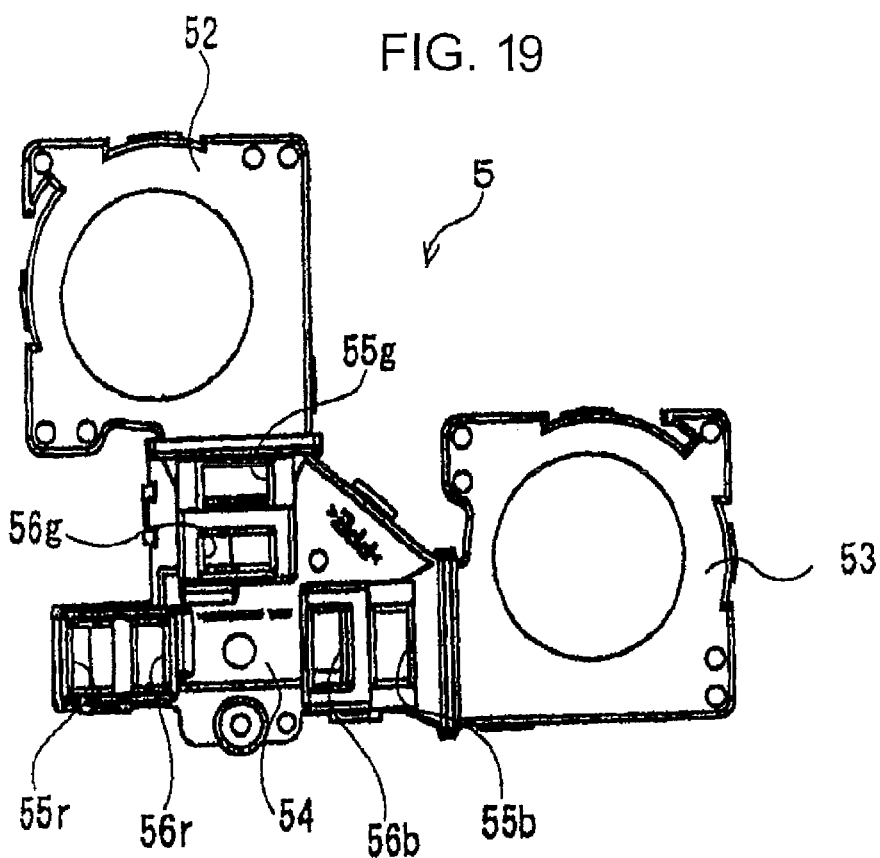
FIG. 19 is a plan view of a cooling unit.

The cooling unit 5 has a first fan 52, a second fan 53, and a generally T-shaped housing 54, as shown in FIG. 19. Provided in the housing 54 are air channels for leading ambient air inspired by the cooling fans 52 and 53 to the three LCPs 33b, 33g, and 33r and the three incidence polarization plates 32b, 32g, and 32r shown in FIG. 5. It is noted that the first and second fans 52 and 53, respectively, are arranged to blow air in two intersecting directions.

Figure 20:
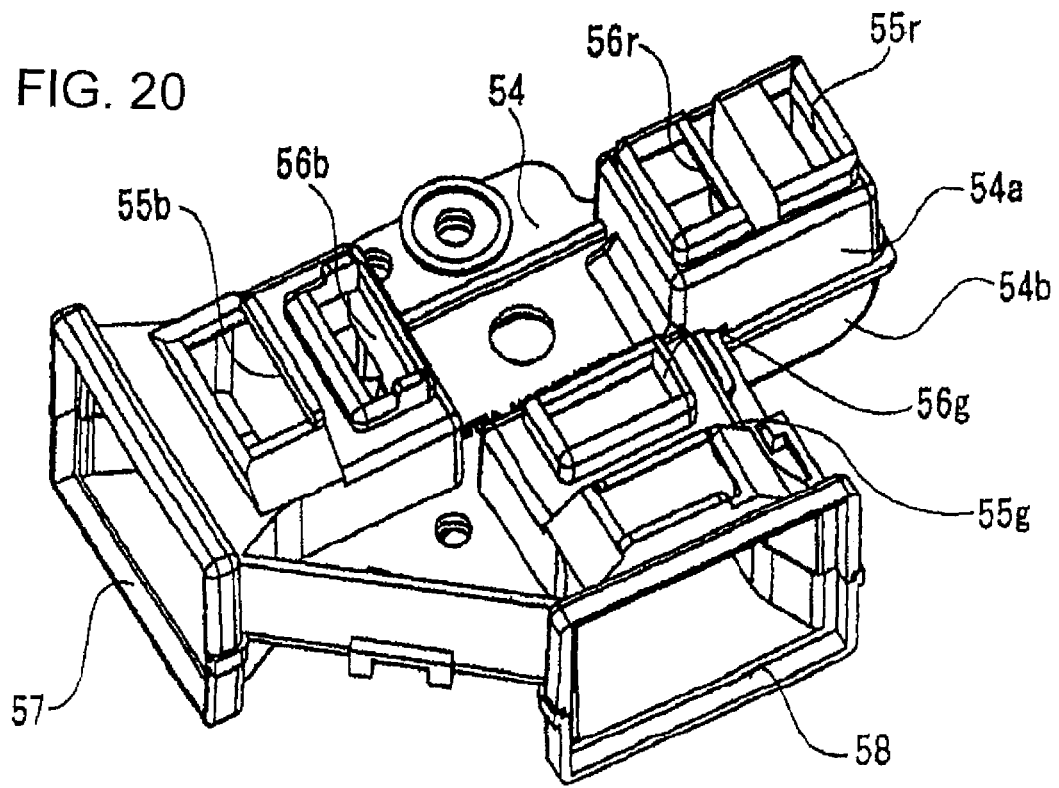
FIG. 20 is a perspective view of the housing of the cooling unit.
Figure 21:
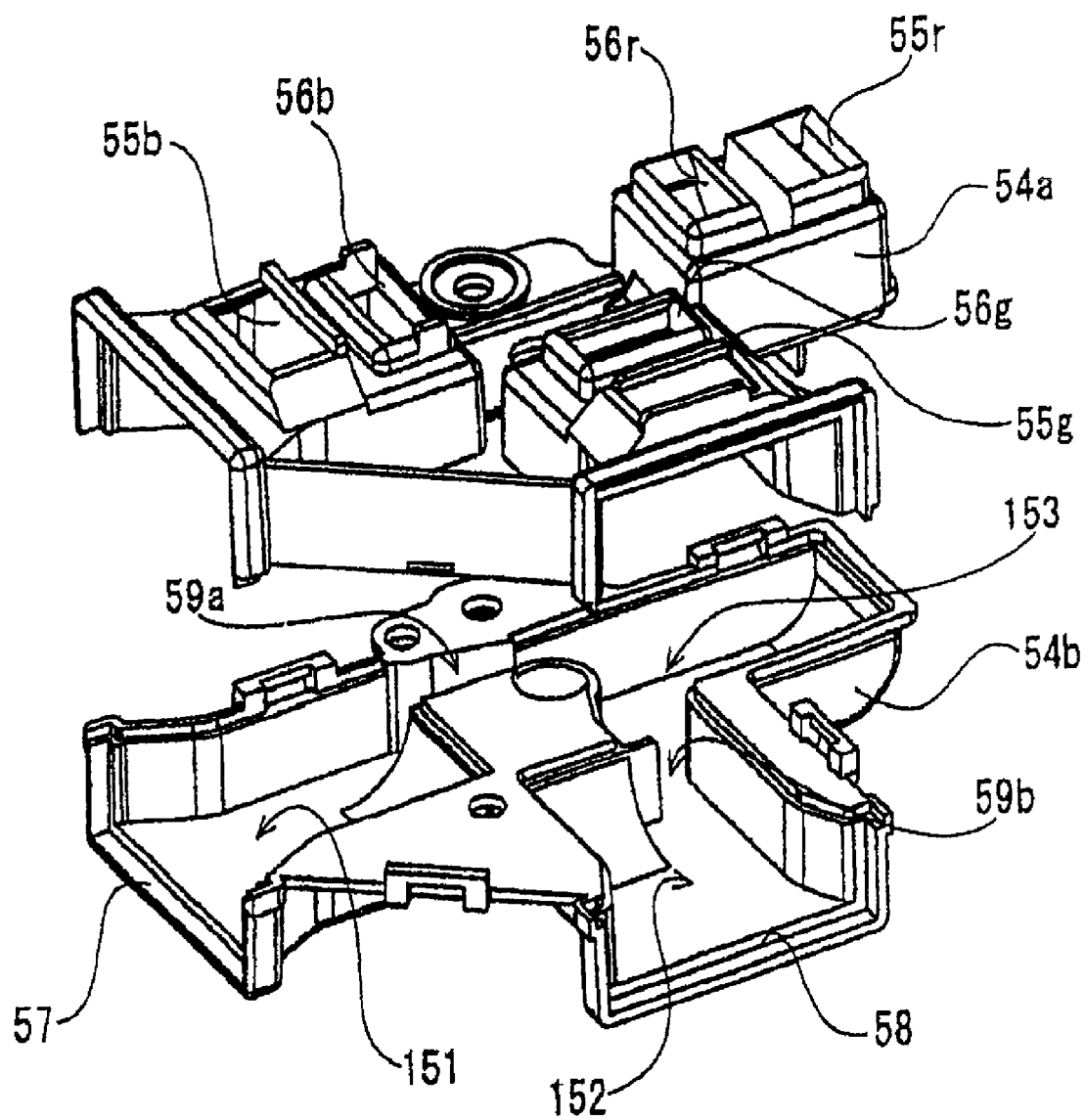
FIG. 21 is an exploded perspective view of the housing shown in FIG. 20.

As shown in FIGS. 20 and 21, the housing 54 has an upper half section 54a and a lower half section 54b, which are bonded together. The housing 54 has a first mounting opening 57 to which the first fan 52 is connected and a second mounting opening 58 to which the second fan 53 is connected. The two openings are oriented in perpendicular directions.

Formed in the upper half section 54a of the housing are: a first outlet 55b for blowing air to the B-incident polarization plate 32b shown in FIG. 5 (the outlet hereinafter referred to as first B-outlet) and a second outlet 56b for blowing air to the B-LCP 33b (the outlet hereinafter referred to as second B-outlet), both outlets being adjacent to the first mounting opening 57; and a first outlet 55g for blowing air to the G-incident polarization plate 32g (the outlet hereinafter referred to as first G-outlet) and a second outlet 56g for blowing air to the G-LCP 33g (the outlet hereinafter referred to as second G-outlet), both outlets being adjacent to the first mounting opening 57.

Also formed in the upper half section 54a are: a first outlet 55r for blowing air to the R-incident polarization plate 32r shown in FIG. 5 (the outlet hereinafter referred to as first R-outlet) and a second outlet 56r for blowing air to the R-LCP 33r (the outlet hereinafter referred to as second R-outlet), both outlets being disposed away from the first mounting opening 57 but along the air channel for the ambient air introduced from the first mounting opening 57.

Figure 22:
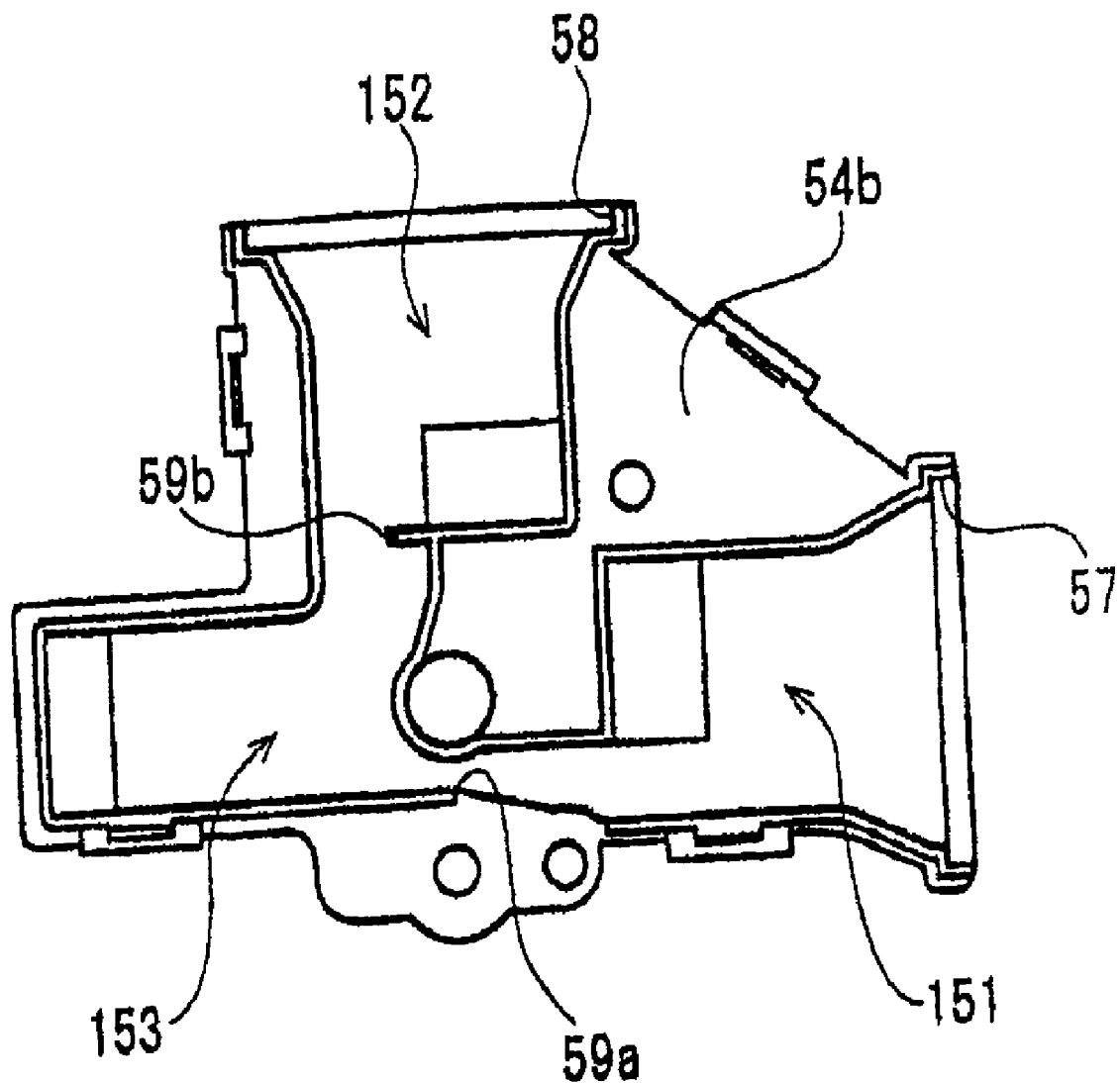
FIG. 22 is a plan view of the lower half section of the housing.

On the other hand, as shown in FIGS. 21 and 22, formed in the lower half section of the housing 54b are: a first upstream air channel 151 that extends linearly from the first mounting opening 57 to the first B-outlet 55b and second B-outlet 56b; a second upstream air channel 152 that extends linearly from the second mounting opening 58 to the first G-outlet 55g and second G-outlet 56g; and a downstream air channel 153 that merges into the first and second upstream air channels 151 and 152, respectively, and extends to the first and second R-outlets 55r and 56r, respectively.

In addition, a first throttling section 59a is formed between the first upstream air channel 151 and the downstream air channel 153, and a second throttling section 59b between the second upstream air channel 152 and the downstream air channel 153.

Thus, the amount of air introduced by the first fan 52 and delivered past the first mounting opening 57 of the housing 54 to the downstream air channel 153 through the first upstream air channel 151 is limited by the flow resistance across the first throttling section 59a to a constant level, which causes the air passing through the first mounting opening 57 to be partly blown out of the first B-outlet 55b and second B-outlet 56b upstream of the first throttling, section 59a. This arrangement will fully cool the B-incidence polarization plate 32b and B-LCP 33b.

Similarly, the amount of air introduced from the second fan 53 and delivered past the second mounting opening 58 to the downstream air channel 153 through the second upstream air channel 152 is limited by the flow resistance across the second throttling section 59b to a constant level, which causes the air passing through the second mounting opening 58 to be partly blown out of the second G-outlet 55g and second G-outlet 56g upstream of the second throttling section 59b. This arrangement will fully cools the G-incidence polarization plate 32g and G-LCP 33g.

A predetermined amount of air that has passed through the first throttling section 59a flows directly to the first R-outlet 55r and the second R-outlet 56r via the downstream air channel 153, while a predetermined amount of air that has passed through the second throttling section 59b flows into the downstream air channel 153 and merges into the flow streaming to the first R-outlet 55r and the second R-outlet 56r. As a result, a predetermined amount of air passing through the first mounting opening 57 and the first throttling section 59a and a predetermined amount of air passing through the second mounting opening 58 and the second throttling section 59b are further passed through the downstream air channel 153 and discharged from the first R-outlet 55r and second R-outlet 56r to fully cool the R-incidence polarization plate 32r and R-LCP 33r.

It will be recalled that in conventional LC projector apparatuses, the cooling unit is equipped with three cooling fans one for each color LCP. In contrast, in the present invention, only two cooling fans 52 and 53 suffice to fully cool the three incidence polarization plates 32r, 32g, and 32r as well as the three LPCs 33r, 33g, and 33b. In this way, the removal of a cooling fan enables not only miniaturization of the cooling unit, but also reduction of the power consumption by the cooling unit.

Lamp Unit 4

Figure 23:
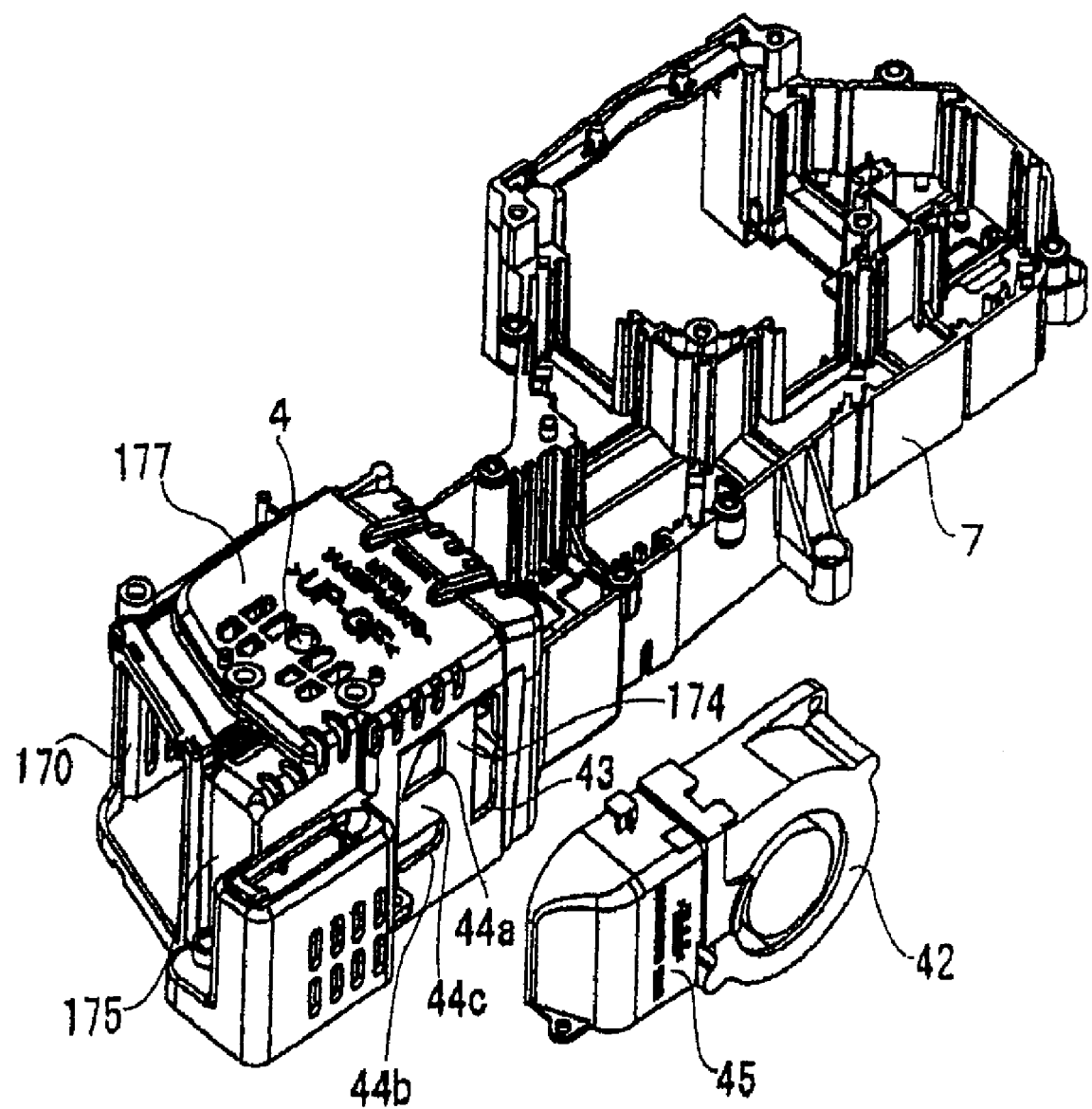
FIG. 23 is a-perspective view of a lamp cooling fan to be mounted on the optical system holder case.

As shown in FIG. 2, the lamp unit 4 is accommodated at the far right of the optical system holder case 7. An air-inlet housing 45 is mounted on the rear right wall 174 of the optical system holder case 7, and a lamp cooling fan 42 for cooling the lamp unit 4 is mounted on one end of the air-inlet housing 45, as shown in FIG. 23.

Figure 24:
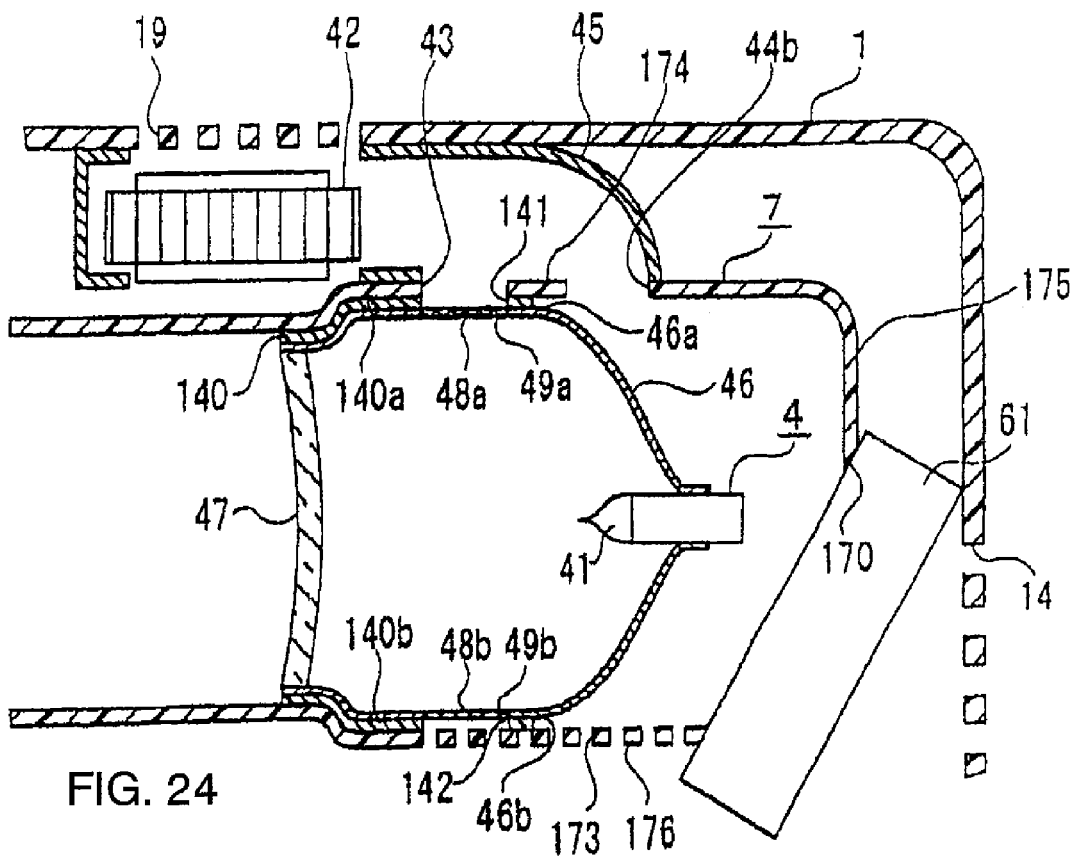
FIG. 24 is a vertical cross section of a lamp unit.
Figure 25:
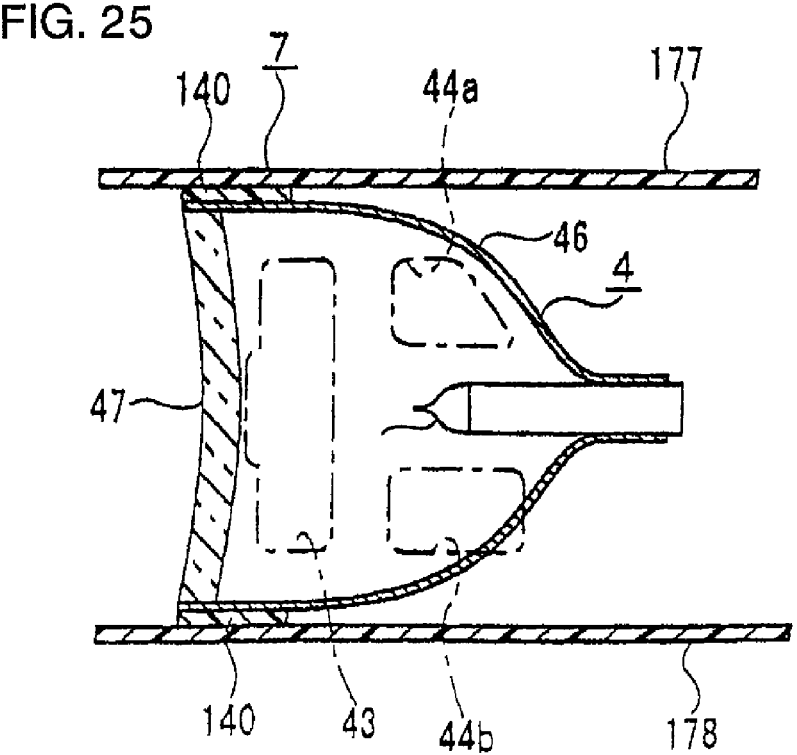
FIG. 25 is a horizontal cross section of the lamp unit.

As shown in FIGS. 24 and 25, the lamp unit 4 includes a lamp reflector 46, a lamp 41 located at the focal point of the lamp reflector 46, a lens 47 located downstream of the lamp 41 in the light emitting direction, and a lamp housing 140 formed of rectangular frames. The back of the lamp reflector 46 is surrounded by four side walls 174, 176, 177, and 178 of the optical system holder case 7.

As shown in FIG. 24, the lamp unit 4 is installed at the far right of the optical system holder case 7 with the side walls 140a and 140b of the lamp housing 140 held in contact with the side walls 174 and 176 of the optical system holder case 7. Formed in the rear section of the side wall 140a of the lamp housing 140 is an introducing hole 141 for introducing air into the lamp housing 140. Formed in the rear section of the side wall 46a of the reflector 46 is an opening 49a in association with the air-intake hole 141. A metal mesh filter 48a is fitted in the opening 49a.

On the other hand, an air-outlet hole 142 is formed in the front side wall 140b of the lamp housing 140 and in opposition to the air-intake hole 141. A further opening 49b facing the air-outlet hole 142 is formed in the front side wall 46b of the reflector 46. A metal mesh filter 48b is fitted in the opening 49b.

As shown in FIG. 23, a first intake port 43, a second intake port 44a, and a third intake port 44b are provided on the right rear wall 174 of the optical system holder case 7 to introduce air from the lamp cooling fan 42 into the optical system holder case 7. The first intake port 43 has a vertically elongate rectangular opening (the vertical length referred to as width). The second and third intake ports 44a and 44b, respectively, also have a rectangular opening which is one third in width as compared with the first intake port 43. Formed between the two intake ports 44a and 44b is an air blocking wall 44c, which is about one third in width of the first intake port 43. The air blocking wall 44c constitutes a portion of the rear wall 174 of the optical system holder case 7.

As shown in FIG. 24, the opening of the first intake port 43 faces the air-intake hole 141 of the lamp housing 140 and the opening 49a of the reflector 46, while the second intake port 44a and the third intake port 44b have openings facing the back of the reflector 46.

Formed in the right end wall 175 of the optical system holder case 7 is an outlet 170 for discharging exhaust air, as shown in FIG. 23. This outlet 170 is oblique relative to the right end wall of the lower half section 12 of the casing 1 on which the exhaust unit 6 is mounted, as shown in FIG. 2. The first exhaust fan 61 of the exhaust unit 6 is arranged in association with this outlet 170.

There is provided in the rear wall of the lower half section 12 of the casing 1 a rear inlet 19 having slits, as shown in FIG. 2. The lamp cooling fan 42 of FIG. 23 is arranged to face the rear inlet 19. The air inspired from the rear inlet 19 of the casing 1 by the lamp cooling fan 42 is introduced to the lamp unit 4 through the air channel formed in the air-inlet housing 45 and via the first through third intake ports 43, 44a, and 44b, as shown in FIG. 24.

After passing through the first intake port 43, the air is introduced into the space inside the reflector 46 via the air-intake hole 141 of the lamp housing 140 and via the mesh filter 48a of the reflector 46, and discharged out of the space via the mesh filter 48b and air-outlet hole 142-facing the air-intake hole 141, and then discharged out of the optical system holder case 7 through the outlet slits 173. The hot air discharged from the case 7 is inhaled by the first exhaust fan 61 and discharged from the exhaust 14 of the casing 1.

On the other hand, since the air blocking wall 44c is located between the second intake port 44a and the third intake port 44b, as shown in FIG. 23, the air blocking wall 44c establishes an air stream, past the second intake port 44a, that flows above the reflector 46, and an air stream, past the third intake port 44b, that flow that flows under the reflector 46.

The air flowing above and under the reflector 46 is inhaled into the first exhaust fan 61 and discharged out of the casing 1 from the exhaust 14.

If the there were no air blocking wall 44c as shown in FIG. 23 and the lamp unit 4 was cooled solely by the air taken in from an integral large inlet that amounts to the second 44a plus the third intake port 44b, the optical system holder cases suffer a problem that, in spite of sufficient amount of air supplied to the optical system holder case 7, its upper walls 177 and 178 would be thermally altered and deteriorated by the heat emitted from the lamp unit 4.

Analyses of the cause of this problem reveals that most of the air introduced from one inlet mostly flows along the back face of the reflector 46 at an intermediate level between the upper and lower ends of the reflector 46. As a consequence, although a middle section of the reflector 46 is cooled to a certain degree, the upper section of the reflector 46 adjacent the upper wall 177 and the lower section of the reflector 46 adjacent the lower wall 178 of the optical system holder case 7 cannot be fully cooled by the air.

To overcome this problem, the present invention forcibly diverts the air discharged from the lamp cooling fan 42 into two streams that flows above and under the reflector 46, as described above. Thus, as compared with conventional optical system holder cases, the upper and lower sections of the reflector 46 are cooled sufficiently, thereby successfully lowering the temperatures of the upper and lower walls 177 and 178 of the optical system holder case 7 to prevent them from getting thermally deteriorated.

Exhaust System 6

As shown in FIGS. 2 and 3 and described previously, the exhaust unit 6 having the first fan 61 and second exhaust fan 62 is installed on the right wall of the lower half section 12 of the casing 1. The first exhaust fan 61 is arranged with its air inspiration face directed to the lamp unit 4, while the second exhaust fan 62 is arranged with its air inspiration face directed to the electric power unit 9. Thus, the two exhaust air streams from the fans 61 and 62 intersect each other.

Figure 26:
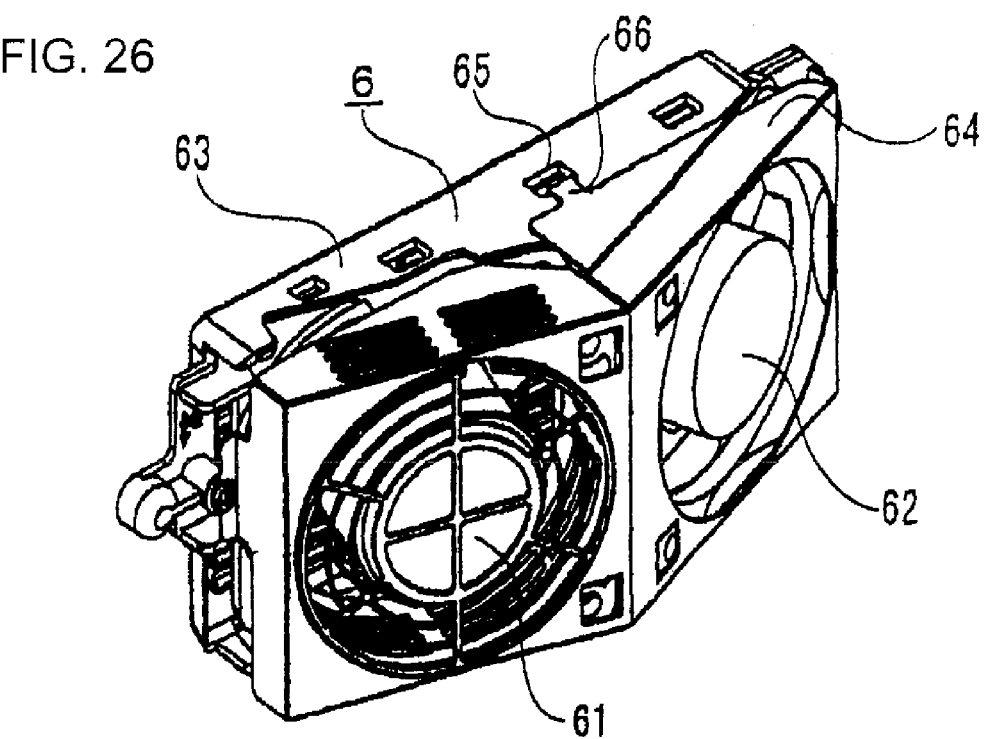
FIG. 26 is a perspective view of an exhaust unit.
Figure 27:
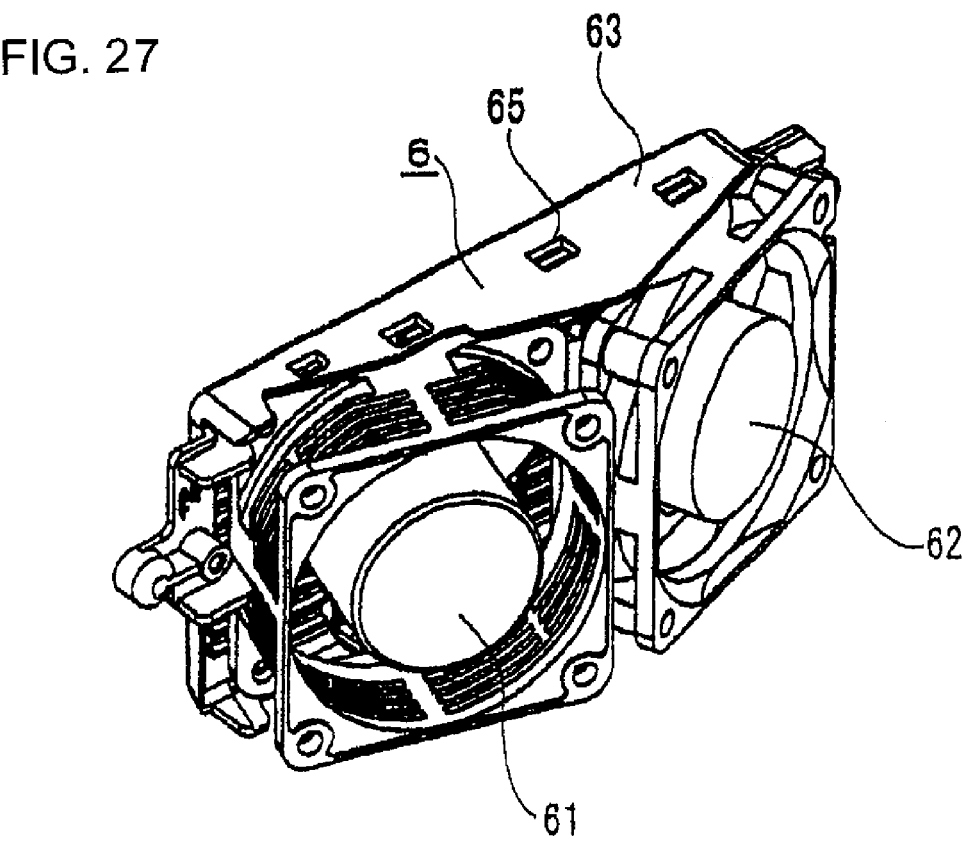
FIG. 27 is a perspective view of the exhaust unit with its fan cover removed.

The first exhaust fan 61 and second exhaust fan 62 of the exhaust unit 6 are arranged between a fan holder 63 made of a synthetic resin and a metal fan cover 64, as shown in FIGS. 26 and 27. The fan cover 64 is provided on the upper and lower ends thereof with protruding hooks 66 that can engage the grooves 65 formed on the upper and lower walls of the fan holder 63. With the hooks 66 engaged with the grooves 65 of the fan holder 63, the fan cover 64 is secured on the opposite ends thereof with screws.

As pointed previously, conventional LC projector apparatuses have an exhaust unit equipped with only one exhaust fan facing the lamp unit. As a consequence, the air heated to a high temperature in the vicinity of the lamp unit-is discharged from the exhaust unit, bringing discomfort to users who are exposed to the exhaust air.

In the LCP projector apparatus of the present invention, since the air inspiration face of the first exhaust fan 61 is oriented to the lamp unit 4 as shown in FIG. 2, the first exhaust fan 61 can intensively inspire hot air heated by the lamp unit 4. On the other hand, the second exhaust fan 62 is oriented to the power supply unit 9 located away from the lamp unit 4, so that the second exhaust fan 62 inspires cooler air than the air inspired by the first exhaust fan 61.

Since the two exhaust air streams from the exhaust fans 61 and 62 intersect each other, the two streams merge at an angle (referred to as an intersecting angle) and, after getting mixed together, come out from the exhaust 14 at a lower temperature than the conventional exhaust air.

Furthermore, an installation area for the first and second exhaust fans 61 and 62, respectively, in the casing 1 increases with the intersecting angle between the two exhaust air streams from the fans 61 and 62. To determine the optimum intersecting angle between the two exhaust air streams at which the temperature of the exhaust air is most reduced, a number of experiments were conducted to measure the exhaust air temperature as a function of the intersecting angle. It was found that the optimum intersecting angle is in the range from 40 to 60 degrees.

That is, when the intersecting angle is less than 40 degrees, the air inspired by the two exhaust fans 61 and 62 will be exhausted without being fully mixed together. As a consequence, hot air is exhausted by the first exhaust fan 61 of the exhaust unit 6 while cool air is exhausted by the second exhaust fan 62.

On the other hand, when the intersecting angle is in the range from 40 to 60 degrees, the hot air inspired by the first exhaust fan 61 and the cool air inspired by the second exhaust fan 62 will be well mixed, resulting in fairly cool exhaust air.

However, as the intersecting angle exceeds 60 degrees, the exhaust air temperature is not lowered as much as that for the intersecting angle in the range between 40 and 60 degrees. Moreover, as the intersecting angle approaches 90 degrees, the hot air inspired by the first exhaust fan 61 and the cool air inspired by the second exhaust fan 62 will run into each other, which destructs a smooth rearward flow of air and prevents desired cooling of the exhaust air.

Therefore, in the example shown herein, the intersecting angle between the two exhaust air streams from the first exhaust fan 61 and the second exhaust fan 62 is set to 40 degrees. To do this, the first and second exhaust fans 61 and 62, respectively, are mounted at an angle of 20 degrees with respect to the right wall of the casing 1. This angle enables sufficient lowering of the exhaust air temperature while achieving minimization of the increased installation space for the exhaust unit.

It was shown in the experiments that the temperature of the exhaust air from the exhaust unit 6 is lowered below the conventional exhaust temperature by about 10° C. and the level of noise generated by the exhaust unit 6 is reduced by 2 db if the rotational frequencies of the exhaust fans 61 and 62 are reduced below that of a conventional frequency.

Furthermore, in a low power consumption mode where the intensity of light emitted from the lamp unit 4 is reduced to a lower level, the rotational frequencies of the first and second exhaust fans 61 and 62, respectively, can be further reduced, thereby further reducing the noise level of the exhaust unit 6.

Improved Arrangement of Exhaust System for Lowering Exhaust Air Temperature

Figure 28:
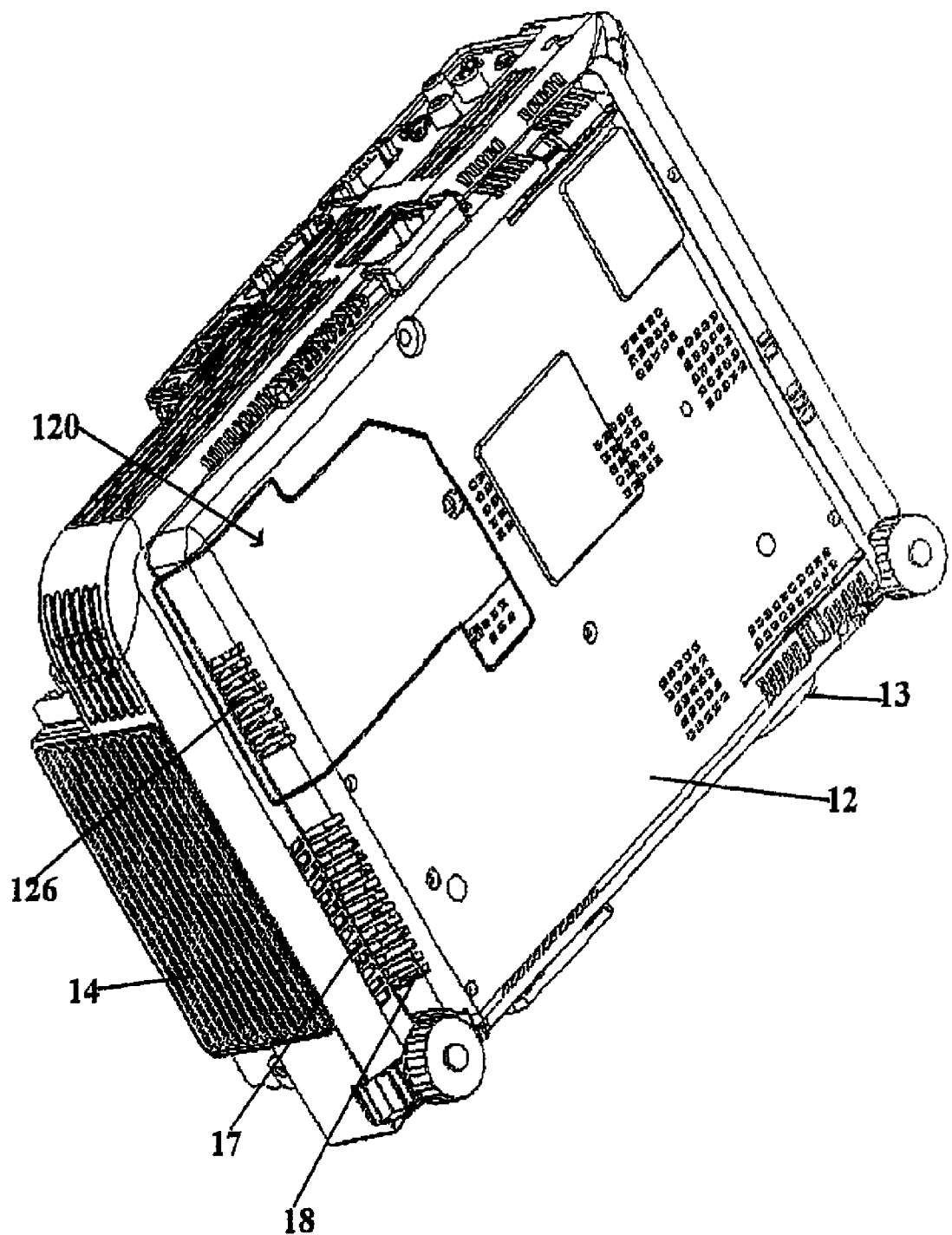
FIG. 28 is another perspective view of the LC projector apparatus of the invention.
Figure 29:
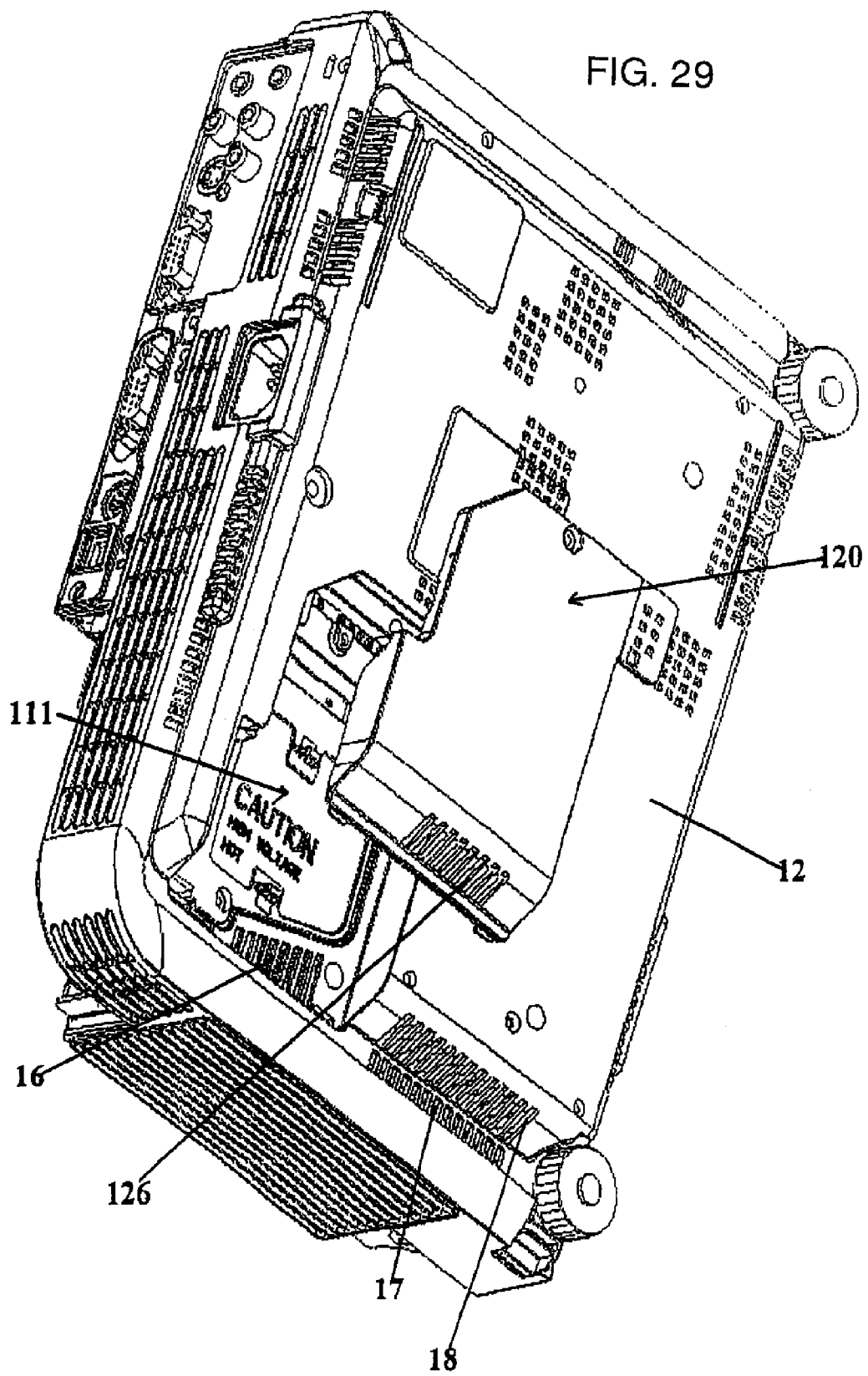
FIG. 29 is a still another exploded perspective view of the LC projector apparatus of the invention.

The LCP projector apparatus of the present invention is provided in the lower half section of the casing 1 with a lamp unit cover 120, a lamp unit mounting opening 111, lower case inlets 16 and 17, and an inlet 18 (referred to as inclined side inlet) formed in the inclined side wall of the lower half section, as shown in FIGS. 28 and 29. The lamp unit cover 120 is provided on the inclined side wall thereof with a further inlet (referred to as lamp cover inlet) 126.

Figure 30:
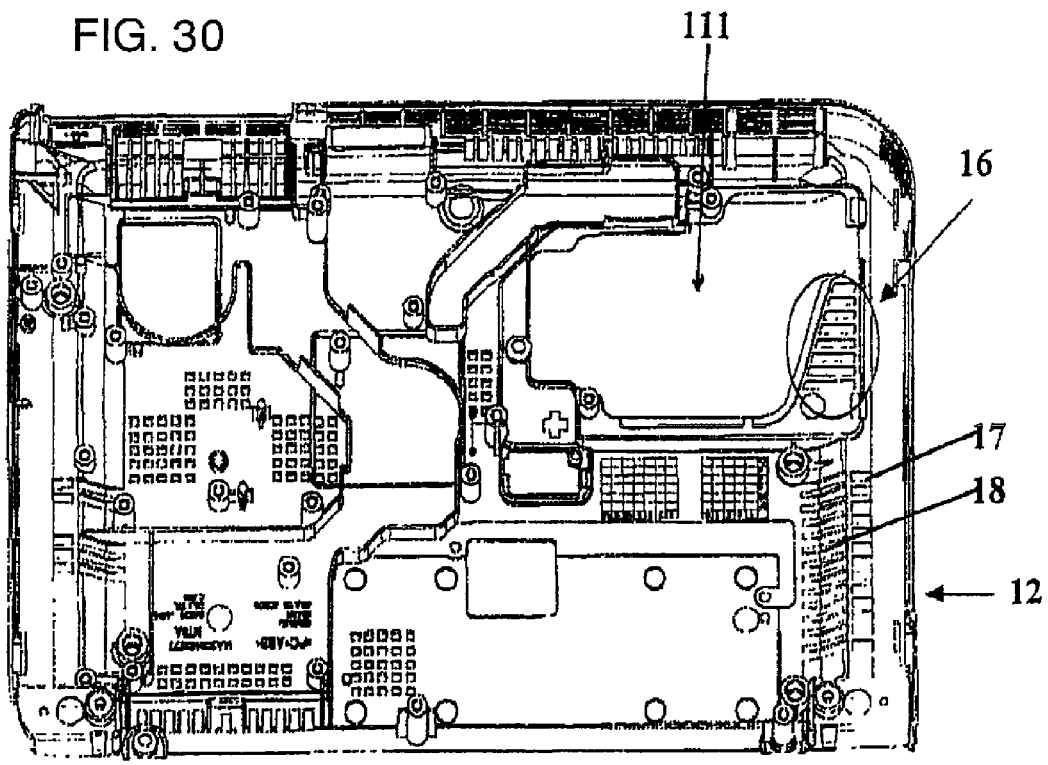
FIG. 30 is a plan view of the lower half section of the casing.
Figure 31:
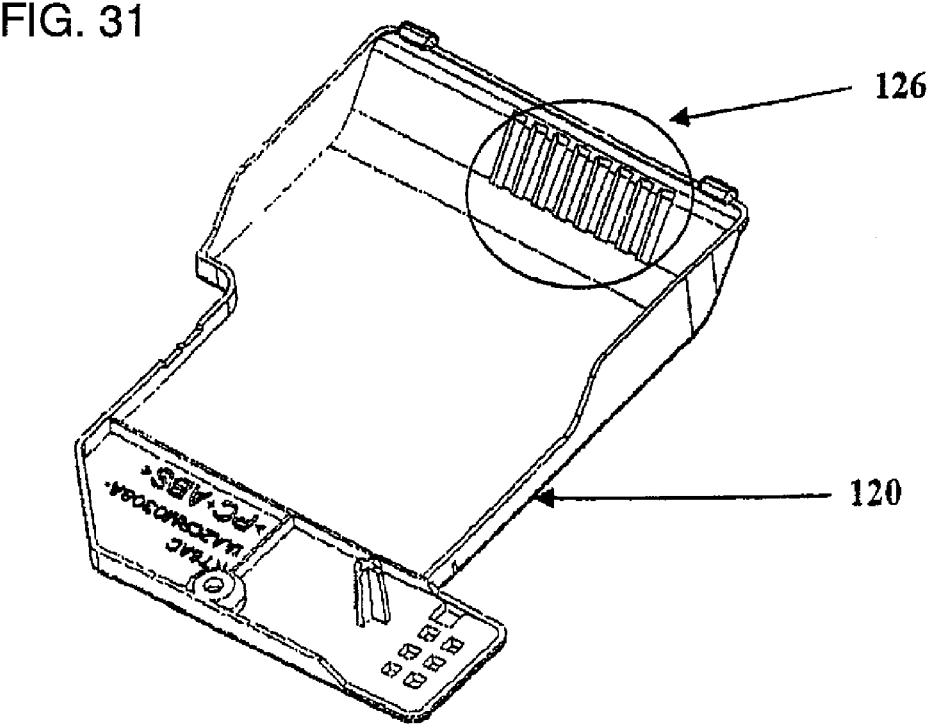
FIG. 31 is a perspective view of a lamp unit cover.
Figure 32:
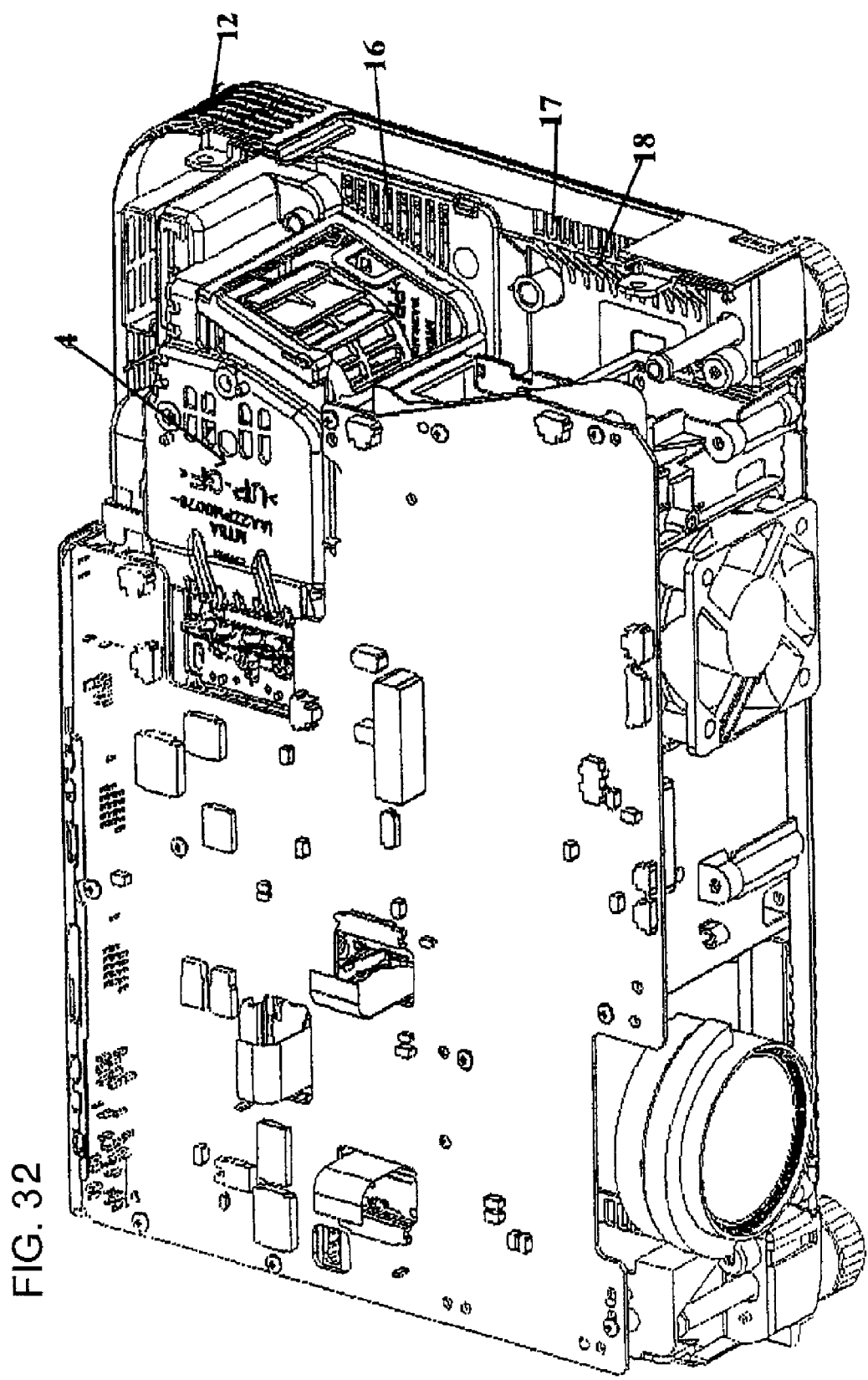
FIG. 32 is a perspective view of the LC projector apparatus, with the upper half section of the casing and the exhaust unit removed.

Referring to FIGS. 30, 31, and 32 together, it is seen that the lower case inlet 16 and the lamp cover inlet 126 are located directly below the first exhaust fan 61, and that the lower case inlet 17 and inclined side inlet 18 are located in association with the second exhaust fan 62.

The lamp unit cover 120 is provided for convenience of replacing the lamp unit 4. When the lamp unit 4 needs to be replaced, the lamp unit cover 120 is opened to remove the old lamp unit from the lamp unit mounting opening 111 and replace it with a new one. Replacement work is finished by closing the lamp unit cover 120.

Figure 33:
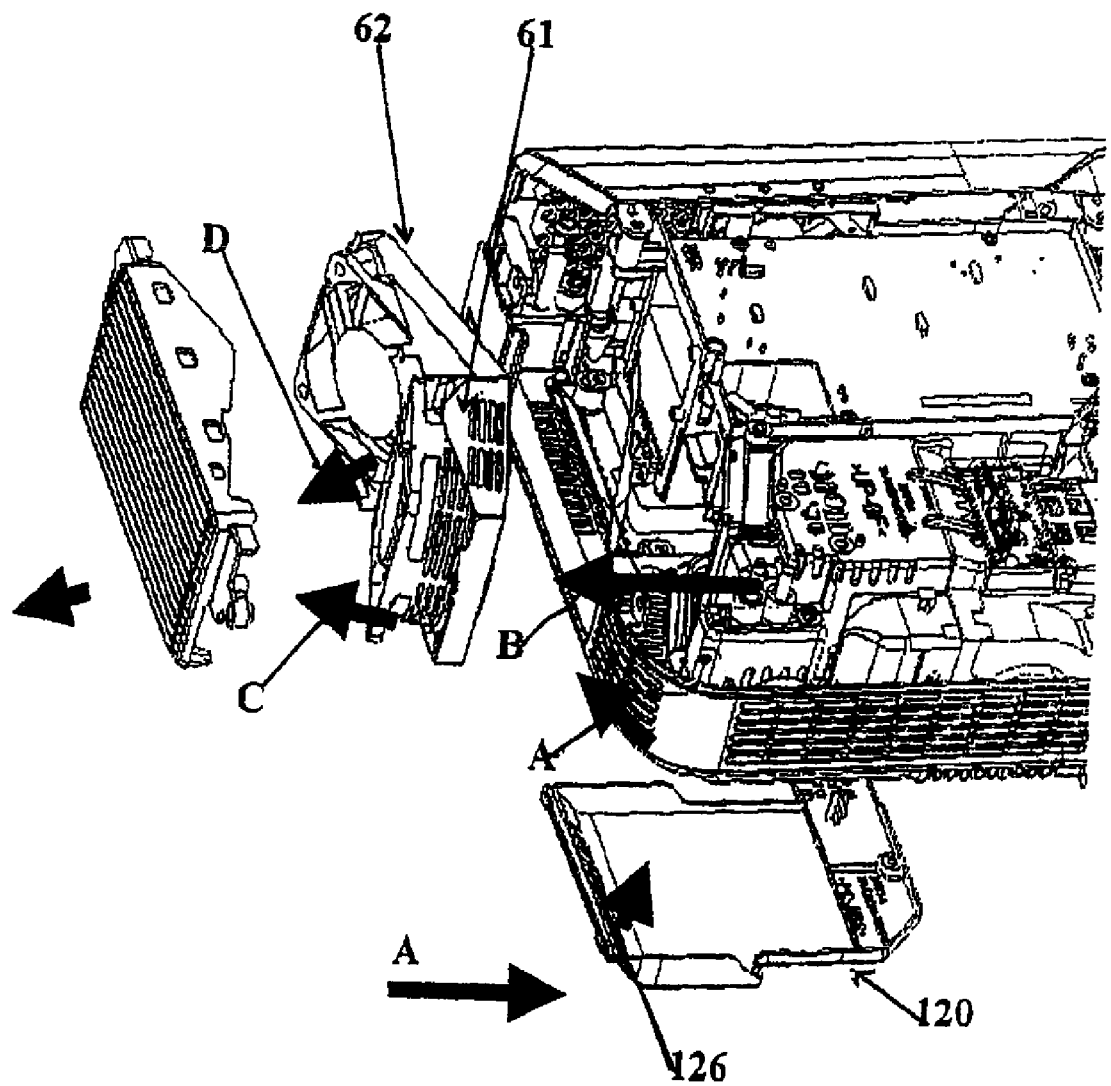
FIG. 33 is an exploded perspective view of the LC projector apparatus with the upper half section of the casing removed, briefly showing air streams coming in and out of the casing by arrows.

Referring to FIG. 33, principles lying behind the cooling mechanism of the improved exhaust unit of the invention will now be described below. In operation, cool ambient air A is introduced from outside the projector apparatus into the projector apparatus through the lamp cover inlet 126 of the lamp unit cover 120, and further into the opening (not shown) formed in the side wall of the first exhaust fan 61 via the lower case inlet 16 formed in the lower half section 12 of the casing 1. The hot air B inspired from the lamp unit 4 is mixed with the external cool air A by the first exhaust fan 61 before it is expired from the fan 61. The air C thus expired is further mixed with the air D expired from the second exhaust fan 62. The mixed air is discharged from the projector apparatus.

It is noted that the increment of external cool air A inspired by the first exhaust fan 61 facilitates the mixing of that air with the air inspired by the second exhaust fan 62. As a consequence, the temperature of the exhaust air is appreciably lowered below conventional exhaust air temperatures.

The lamp unit cover intake 126 is formed on the oblique side of the lamp unit cover 120 in order to avoid inlets from being choked by a soft cloth in the event that the projector apparatus is operated on a table covered with a soft cloth.

It will be noted that temperature of the exhaust air can be regulated by altering the areas of the openings of the inlets involved. Each of the inlets can be configured in the shape of a barrier, an array, or any other suitable form. By simply increasing the effective cross section of the lamp unit mounting opening 111, it is possible to introduce ambient fresh air from the lamp cover inlet 126 directly into the first exhaust fan 61.

It is emphasized that, in the embodiment shown herein, in addition to inspiration of air through the inlets (not shown) formed in the side wall of the casing 1, the first exhaust fan 61 inspires ambient air mainly through the lower case inlet 16 and the lamp cover inlet 126 to lower the temperature of the air heated by the lamp unit 4. It is also emphasized that the second exhaust fan 62 simultaneously inspires ambient air through the lower case inlet 17 and inclined side inlet 18 to cool the power unit. That is, the air expired from the second exhaust fan 62 and the air expired from the first exhaust fan 61 are mixed together to lower the temperature of the latter air.

It will be understood that the lower case inlets 16 and 17, respectively, and lamp cover inlet 126 can be formed at any locations on the lower half section 12 of the casing 1 so long as the first exhaust fan 61 and the second exhaust fan 62 can take advantage of their locations in exhausting the air out of the projector apparatus. That is, none of the inlets need not be installed directly below the first and second exhaust fans 61 and 62, respectively.

Without applying the invention, the temperature of the exhaust air from the projection apparatus can rise to 83° C. or higher. However, by providing inlets in the bottom sections of the exhaust fans in accordance with the present invention, the temperature can be suppressed to or below 80° C.

The terms "bottom", "side", "oblique side", and "directly below" employed in the description above are meant to imply relative relationships of exemplary elements involved in the embodiments of the present invention. The relationships can be suitably modified in accordance with many alternatives, modifications, and variations of the invention.

The improvement in air inspiration mechanism of a cooling unit to lower the exhaust air temperature in accordance with the invention may be fulfilled through a local or partial modification of the air inspiration mechanism without changing the basic structure of the existing cooling unit. Such modification may help shorten development cycle, and/or reduce the development cost, of a new projector apparatus, and may allow common use of parts of a basic model.

The invention claimed is:

1. A projector apparatus comprising:
a light source,
an optical system adapted to construct imaging light in response to a beam of light received from said light source, wherein
both said light source and said optical system are accommodated in a casing, and
an exhaust unit mounted on an inner wall of said casing cools the components inside said casing,
said exhaust unit comprising a first exhaust fan and a second exhaust fan, wherein the first exhaust fan and the second exhaust fan are arranged in different planes to allow said airflow from the first exhaust fan and second exhaust fan to intersect,
wherein an exhaust end of the first fan and an exhaust end of the second fan are angled toward each other,
said projector apparatus comprising:
an air inspiration mechanism provided on an inner wall of said casing in association with
said exhaust unit to allow said exhaust unit to inspire ambient air through said air inspiration
mechanism and to lower the temperature of the air to be expired from said exhaust unit.

2. The projector apparatus according to claim 1, wherein; said casing comprises a lower half section; and
said air inspiration mechanism has at least one inlet formed in the bottom wall of said lower half section of said casing.

3. The projector apparatus according to claim 2, wherein said casing has a lamp unit cover for covering said lamp; and
said air inspiration mechanism has an inlet (lamp unit inlet) formed in said lamp unit cover.

4. The projector apparatus according to claim 3, wherein said lamp unit cover has an oblique side; and
said lamp cover inlet is formed in said oblique side.

5. The projector apparatus according to claim 4, wherein the areas of the openings of said inlets are adjustable to regulate the temperature of said exhaust air.

6. The projector apparatus according to claim 5, wherein said inlets are located in association with either or both of said first and second exhaust fans to allow said first and second fans to inspire air through said inlets.

7. The projector apparatus according to claim 6, wherein said first exhaust fan has an air inspiration face oriented to said light source while
said second exhaust fan has an air inspiration face oriented to an area away from said light source, so that the two streams of air expired from the respective exhaust fans intersect each other.

8. The projector apparatus according to claim 7, wherein said at least one inlet is arranged in association with said first exhaust fan and lamp cover inlet.

9. The projector apparatus according to claim 1, wherein said intersection of airflow of the two exhaust fans occurs at an angle greater than 40°.

10. The projector apparatus according to claim 9, wherein said intersection of airflow of the two exhaust fans occurs at an angle less than 60°.

* * * * *

UNITED STATES PATENT AND TRADEMARK OFFICE
CERTIFICATE OF CORRECTION

PATENT NO. : 8,177,372 B2
APPLICATION NO. : 11/844065
DATED : May 15, 2012
INVENTOR(S) : Wanjun Zheng et al.

It is certified that error appears in the above-identified patent and that said Letters Patent is hereby corrected as shown below:

On the Title page, Item (73) Assignee:
Change to be

--(73) Assignee: SANYO Electric Co., Ltd.,
Moriguchi-shi, Osaka (JP)

SANYO Technology Center (Shenzhen) Co., Ltd.
Shenzhen (CN)--

Signed and Sealed this
Fourteenth Day of May, 2013

Teresa Stanek Rea
*Acting Director of the United States Patent and Trademark Office*